United States Patent
Reiss et al.

(10) Patent No.: US 10,346,889 B1
(45) Date of Patent: Jul. 9, 2019

(54) DETERMINING COURIER EFFORT FOR DELIVERIES

(71) Applicant: Square, Inc., San Francisco, CA (US)

(72) Inventors: Jesse Lee Reiss, San Francisco, CA (US); Benjamin R. Bernstein, San Francisco, CA (US); Matthew Rhodes, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 963 days.

(21) Appl. No.: 14/710,808

(22) Filed: May 13, 2015

(51) Int. Cl.
    *G06Q 30/02* (2012.01)
    *G06Q 10/08* (2012.01)
    *H04W 4/02* (2018.01)

(52) U.S. Cl.
    CPC ..... *G06Q 30/0284* (2013.01); *G06Q 10/0833* (2013.01); *H04W 4/025* (2013.01)

(58) Field of Classification Search
    CPC .............. G06Q 30/0284; G06Q 10/0833
    See application file for complete search history.

(56) References Cited

U.S. PATENT DOCUMENTS

| | | | |
|---|---|---|---|
| 6,026,375 A | 2/2000 | Hall et al. | |
| 6,324,476 B1 | 11/2001 | Trovato | |
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,639,908 B1 | 5/2017 | Reiss et al. | |
| 9,679,489 B2 | 6/2017 | Lambert et al. | |
| 9,754,331 B1 * | 9/2017 | Beckelman | G06Q 10/10 |
| 9,811,838 B1 | 11/2017 | Daire et al. | |
| 9,858,614 B2 * | 1/2018 | Seaward | G06Q 30/0637 |
| 10,133,995 B1 | 11/2018 | Reiss et al. | |
| 10,181,111 B1 | 1/2019 | Ohli et al. | |
| 2002/0077937 A1 | 6/2002 | Lyons et al. | |
| 2002/0138350 A1 | 9/2002 | Cogen | |
| 2002/0143655 A1 | 10/2002 | Elston et al. | |
| 2002/0178074 A1 | 11/2002 | Bloom | |

(Continued)

OTHER PUBLICATIONS

Non-Final Office Action dated Feb. 1, 2018, for U.S. Appl. No. 14/993,149, of Kohli, A., et al., filed Jan. 12, 2016.

(Continued)

*Primary Examiner* — Sujay Koneru
*Assistant Examiner* — Mohamed N El-Bathy
(74) *Attorney, Agent, or Firm* — Mattingly & Malur, PC

(57) ABSTRACT

In some examples, a service provider may receive, from a buyer device, an order for an item from a merchant for delivery to a delivery location. The service provider may determine predicted courier travel times to the merchant location and from the merchant location to the delivery location, and may determine a first payment amount based on the predicted courier travel times. The service provider may further predict other courier time associated with the order, other than travel time, such as based on a courier wait time associated with the merchant. The service provider may determine a second payment amount based on the predicted courier other time. The service provider may send, to a courier device of a courier selected to deliver the order, information about the order including a payment amount for the order based on the first payment amount and the second payment amount.

23 Claims, 9 Drawing Sheets

(56) References Cited

U.S. PATENT DOCUMENTS

| | | |
|---|---|---|
| 2003/0125963 A1 | 7/2003 | Haken |
| 2006/0235754 A1 | 10/2006 | Walker et al. |
| 2006/0293971 A1 | 12/2006 | Hunter et al. |
| 2007/0168118 A1 | 7/2007 | Lappe et al. |
| 2007/0185776 A1 | 8/2007 | Nguyen et al. |
| 2008/0052163 A1 | 2/2008 | Koh |
| 2008/0275643 A1 | 11/2008 | Yaqub et al. |
| 2009/0106124 A1 | 4/2009 | Yang |
| 2009/0187488 A1 | 7/2009 | Shamilian |
| 2009/0254445 A1 | 10/2009 | Bennett et al. |
| 2009/0281903 A1 | 11/2009 | Blatsein |
| 2009/0307096 A1 | 12/2009 | Antonellis |
| 2010/0076853 A1 | 3/2010 | Schwarz |
| 2010/0114790 A1 | 5/2010 | Strimling et al. |
| 2011/0055046 A1 | 3/2011 | Bowen et al. |
| 2012/0036028 A1 | 2/2012 | Webb |
| 2012/0173308 A1 | 7/2012 | Brown et al. |
| 2012/0197722 A1 | 8/2012 | Mesaros |
| 2012/0203619 A1 | 8/2012 | Lutnick et al. |
| 2012/0303425 A1 | 11/2012 | Katzin et al. |
| 2013/0006747 A1 | 1/2013 | Wu |
| 2013/0046605 A1 | 2/2013 | Baron et al. |
| 2013/0054323 A1 | 2/2013 | Charles |
| 2013/0080204 A1 | 3/2013 | Khorashadi et al. |
| 2013/0110396 A1 | 5/2013 | Choudhury |
| 2013/0151357 A1 | 6/2013 | Havas et al. |
| 2013/0218727 A1 | 8/2013 | Lutnick et al. |
| 2013/0226651 A1 | 8/2013 | Napper |
| 2013/0246207 A1 | 9/2013 | Novak et al. |
| 2013/0290172 A1 | 10/2013 | Mashinsky |
| 2013/0317940 A1 | 11/2013 | Fitz |
| 2014/0011522 A1 | 1/2014 | Lin et al. |
| 2014/0074743 A1 | 3/2014 | Rademaker |
| 2014/0089135 A1 | 3/2014 | Linh et al. |
| 2014/0095311 A1 | 4/2014 | Bulloch, Jr. |
| 2014/0164126 A1* | 6/2014 | Nicholas ............... A63F 9/24 705/14.58 |
| 2014/0180959 A1 | 6/2014 | Gillen et al. |
| 2014/0188637 A1 | 7/2014 | Balasubramaniam et al. |
| 2014/0188650 A1 | 7/2014 | Sun et al. |
| 2014/0214465 A1 | 7/2014 | L'Heureux et al. |
| 2014/0222519 A1* | 8/2014 | Swinson ............... G06Q 30/02 705/7.35 |
| 2014/0226487 A1 | 8/2014 | Forssell et al. |
| 2014/0279081 A1 | 9/2014 | Marx et al. |
| 2014/0279667 A1 | 9/2014 | Gillen |
| 2014/0310196 A1 | 10/2014 | Yamamura |
| 2014/0343841 A1 | 11/2014 | Faaborg et al. |
| 2014/0370167 A1 | 12/2014 | Garden |
| 2015/0095122 A1* | 4/2015 | Eramian ............... G07B 15/00 705/13 |
| 2015/0112774 A1 | 4/2015 | Georgoff et al. |
| 2015/0178778 A1 | 6/2015 | Lee et al. |
| 2015/0206093 A1 | 7/2015 | Trew et al. |
| 2015/0227888 A1 | 8/2015 | Levanon et al. |
| 2015/0227890 A1 | 8/2015 | Bednarek et al. |
| 2015/0262121 A1 | 9/2015 | Riel-Dalpe et al. |
| 2015/0269521 A1 | 9/2015 | Knapp et al. |
| 2015/0286984 A1 | 10/2015 | Dikman et al. |
| 2015/0294265 A1 | 10/2015 | Monteverde |
| 2015/0324717 A1 | 11/2015 | Lord et al. |
| 2015/0324729 A1 | 11/2015 | Lord et al. |
| 2015/0332215 A1* | 11/2015 | Wilson ............... G06Q 10/0832 705/4 |
| 2015/0371317 A1 | 12/2015 | Bosko et al. |
| 2016/0019496 A1* | 1/2016 | Gorlin ............... H01M 4/364 705/333 |
| 2016/0048804 A1 | 2/2016 | Paul et al. |
| 2016/0063438 A1 | 3/2016 | Shuken et al. |
| 2016/0071050 A1 | 3/2016 | Kaye |
| 2016/0171591 A1 | 6/2016 | Williams et al. |
| 2016/0196525 A1 | 7/2016 | Kantor et al. |
| 2016/0196528 A1 | 7/2016 | Lemmon |
| 2016/0292664 A1 | 10/2016 | Gilfoyle |
| 2017/0200218 A1 | 7/2017 | Napper |
| 2018/0022405 A1 | 1/2018 | Gecchelin et al. |
| 2018/0047242 A1 | 2/2018 | Lutnick et al. |

OTHER PUBLICATIONS

Non-Final Office dated Feb. 28, 2018, for U.S. Appl. No. 14/642,875, of Reiss, J.L., et al., filed Mar. 10, 2015.
Non-Final Office Action dated Mar. 8, 2018, for U.S. Appl. No. 14/663,678, of Reiss, J.L., et al., filed Mar. 20, 2015.
Non-Final Office Action dated Apr. 3, 2018, for U.S. Appl. No. 14/926,056, of Bernstein, B.R., et al., filed Oct. 29, 2015.
Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.
Kauffman, R.J., and Wang, B., "Bid Together, Buy Together: On the Efficacy of Group-Buying Business Models in Internet-Based Selling," Carlson School of Management, last revised on May 16, 2001, pp. 1-44.
Non-Final Office Action dated May 26, 2015, for U.S. Appl. No. 14/625,680, of Kumar, A.R., et al., filed Feb. 19, 2015.
Non-Final Office Action dated Jun. 24, 2015, in U.S. Appl. No. 14/663,671, of Reiss, J.L., et al., filed Mar. 20, 2015.
Notice of Allowance dated Nov. 6, 2015, for U.S. Appl. No. 14/625,680, of Kumar, A.R., et al., filed Feb. 19, 2015.
Final Office Action dated Dec. 24, 2015, in U.S. Appl. No. 14/663,671, of Reiss, J.L., et al., filed Mar. 20, 2015.
Advisory Action dated Mar. 9, 2016, in U.S. Appl. No. 14/663,671, of Reiss, J.L., et al., filed Mar. 20, 2015.
Non-Final Office Action dated Oct. 6, 2016, for U.S. Appl. No. 14/663,671, of Reiss, J.L., et al., filed Mar. 20, 2015.
Notice of Allowance dated Dec. 22, 2016, for U.S. Appl. No. 14/663,671, of Reiss, J.L., et al., filed Mar. 20, 2015.
Non-Final Office Action dated Nov. 9, 2017, for U.S. Appl. No. 14/625,673, of Reiss, J.L., et al., filed Feb. 19, 2015.
Non-Final Office Action dated Jan. 11, 2018, for U.S. Appl. No. 14/625,683, of Kumar, A.R., et al., filed Feb. 19, 2015.
Non-Final Office Action dated Jan. 12, 2018, for U.S. Appl. No. 14/813,358, of Kohli, A., filed Jul. 30, 2015.
Non-Final Office Action dated Jan. 18, 2018, for U.S. Appl. No. 14/985,267, of Rhodes, M., et al., filed Dec. 30, 2015.
Non-Final Office Action dated Jan. 26, 2018, for U.S. Appl. No. 14/838,446, of Kohli, A., filed Aug. 28, 2015.
Notice of Allowance dated Jun. 25, 2018, for U.S. Appl. No. 14/625,673, of Reiss, J.L., et al., filed Feb. 19, 2015.
Final Office Action dated Jul. 23, 2018, for U.S. Appl. No. 14/663,678, of Reiss, J.L., et al., filed Mar. 20, 2015.
Notice of Allowance dated Sep. 6, 2018, for U.S. Appl. No. 14/993,149, of Kohli, A., et al., filed Jan. 12, 2016.
Final Office Action dated Oct. 17, 2018, for U.S. Appl. No. 14/926,056, of Bernstein, B.R., et al., filed Oct. 29, 2015.
Final Office Action dated Nov. 16, 2018, for U.S. Appl. No. 14/813,358, of Kohli, A., filed Jul. 30, 2015.
Non Final Office Action dated Dec. 17, 2018, for U.S. Appl. No. 14/663,678, of Reiss, J.L., et al., filed Mar. 20, 2015.
Advisory Action dated Jan. 29, 2019, for U.S. Appl. No. 14/926,056, of Bernstein, B.R., et al., filed Oct. 29, 2015.

\* cited by examiner

DETERMINING COURIER EFFORT FOR DELIVERIES

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. However, the service may not always be able to easily determine appropriate payment for the couriers. For example, a fixed hourly pay rate may not adequately compensate the couriers for the amount of effort expended in some cases, or may overcompensate the couriers for the amount of effort expended in other cases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
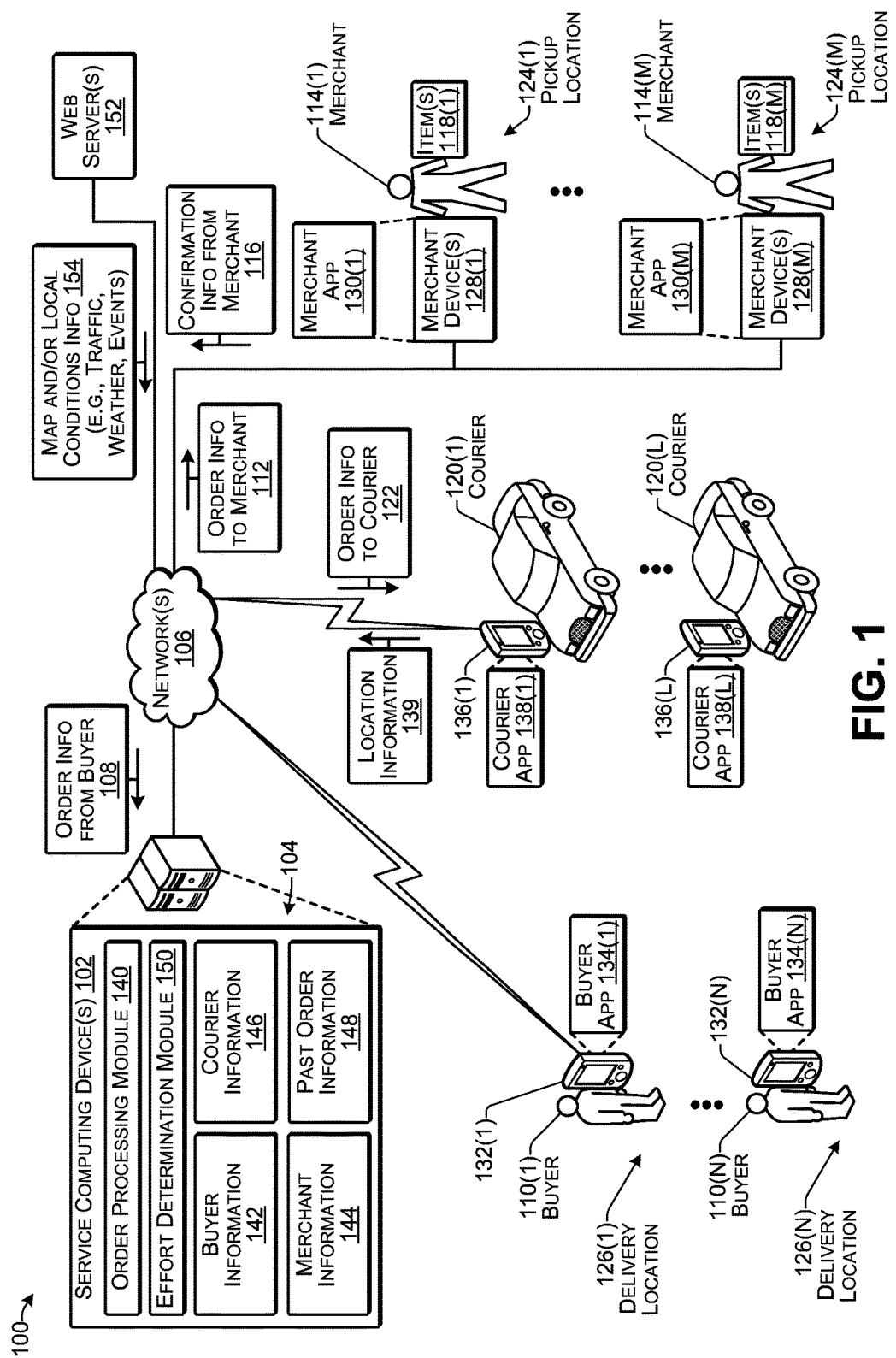
FIG. 1 illustrates an example system for a delivery service that utilizes couriers according to some implementations.

The technology herein provides a novel system that enables people to participate as couriers in a new type of crowdsourced service economy. With the technology herein, essentially any person with a mobile device is able to immediately become a courier, or cease to be a courier, in a courier network that provides delivery services for delivery of items from merchants to buyers. Additionally, through the interaction of a plurality of computing devices, mobile devices, and location sensors, implementations herein are able to track the movement of couriers throughout a service region over time, and can use this information to assist in predicting courier travel times to various delivery locations for various different times of days and days of the week, as well as for determining other types of information. Further, implementations herein can monitor and predict courier travel time and other time spent by the courier for determining appropriate courier payments based at least in part on a predicted amount of courier effort for particular delivery jobs.

In some examples, a service provider may provide a delivery service that enables buyers to order items, such as food items or other goods, from merchants, such as restaurants. When placing an order with a merchant, the buyer may use a buyer application on a buyer device, such as a mobile device or other computing device, to browse through the items available from various different merchants. The buyer may select a particular item to order from a particular merchant, and the service provider may send information about this selection to the particular merchant. Further, the service provider may arrange for a courier to pick up the ordered item from the merchant and deliver the ordered item to the buyer. Based on one or more features associated with an order, the service provider may determine, in advance, the amount of courier effort predicted to be required for a delivery job for delivery of the order from the merchant location to a delivery location specified by the buyer. In some cases, the service provider may offer the delivery job to a courier for a payment amount based on the predicted courier effort for the particular delivery job, while in other cases, the service provider may use the information to determine courier effort expended over time, and pay the courier based on the amount of effort expended over time.

In addition, some examples herein include techniques and arrangements for determining appropriate courier payment for particular delivery jobs. For example, some delivery jobs may require more effort on the part of the courier than other delivery jobs, such as more time, more strength, more stamina, more patience, and the like. Accordingly, the amount of courier effort for a particular delivery job may be quantified based on one or more features that are indicative of courier effort. For example, for a plurality of past delivery jobs, the one or more features may be normalized to generate a distribution curve. Further, the curve may be associated with a courier payment amount. Subsequently, for a new delivery job, the values associated with each feature for the new delivery job may be used for determining a corresponding effort-based payment to be made to a courier that will perform the new delivery job.

Examples of such features for quantifying courier effort may include the distances to be traveled to pick up the order and deliver the order, which may also relate to courier gasoline expenditures; the amount of courier travel time predicted to be required to pick up the order and to deliver the order, which may also relate to how many orders per hour a courier can deliver; the number of items to be delivered, e.g., a large number of items may be generally more difficult for a courier to deliver than a few items; the type or category of item to be delivered, e.g., some categories of items, such as drinks and soups, may be more difficult to deliver than other categories of items; a courier wait time, e.g., the amount of time the courier may spend at the merchant picking up the order or waiting for preparation of the order; a courier handoff time, e.g., the amount of time the courier may spend dropping off the order after arriving at the delivery location, such as if the delivery location is in a high-rise building, or the like; courier vehicle type, e.g., a car may have different predicted travel times from those of a bicycle or scooter; how busy a particular merchant is when the order is placed; accessibility of the buyer delivery location; accessibility of the merchant pickup location; whether there are multiple merchants, multiple orders, and/or multiple buyers for a particular delivery job; and so forth. Thus, in some cases, for each order, the same features may be taken into consideration for determining courier effort associated with that order, with the values of the features also varying from order to order based on various considerations such as current regional conditions (e.g., traffic, weather, local events). Additionally, the order features for determining the courier effort may be revenue neutral, e.g., able to be determined and applied regardless of the amount of money that the buyer will be paying for the order.

In some examples herein, an effort-based courier payment system may include at least one of several possible techniques for quantifying courier effort and/or determining appropriate effort-based payment for a particular delivery job or appropriate effort-based payment for work performed by a courier over a period of time, such as per hour or per day. As one example, a first technique may determine a normalized distribution over multiple delivery job features, such as travel time, distance, number of items, etc., from a large number of past delivery jobs. The normalized distribution may be associated with a payment amount and used to determine an appropriate effort-based courier payment for a given new delivery job. For instance, the courier effort for a new order and corresponding delivery job may be associated with a point on the normalized distribution curve based on values of the features corresponding to the particular delivery job. Based on the location of the point on the normalized distribution curve, the service provider may determine appropriate courier payment for the particular delivery job. In some cases, rather than paying the courier on a per-delivery-job basis, the service provider may determine the amount of courier effort expended over a period of time, and may pay the courier based on cumulative effort expended per hour, per day, etc.

As an example of a second technique, rather than using multiple order features, the courier time may be the primary feature considered for determining courier effort. Further, the courier time may be divided into two categories: courier travel time and courier other time. The courier travel time may include the time that a courier spends traveling from an initial location at which the courier receives a job assignment to a merchant pickup location, and the time that the courier spends traveling from the merchant pickup location to a delivery location specified by the buyer. The courier other time may encompass all other courier time associated with the order that is not travel time, e.g., time during which the courier is waiting at the merchant for the item to be prepared, time spent handing off the order to the buyer after arriving at the delivery location, and so forth. As an incentive to encourage courier effort, a first, higher rate of pay may be associated with travel time and a second, lower rate of pay may be associated with the courier other time. Thus, a payment amount to be paid to a courier for a particular order may be determined based on the predicted courier travel time and the predicted courier other time for the particular order. Alternatively, as another example, based on an amount of courier travel time and courier other time expended by a particular courier over a particular period of time, e.g., per hour or per day, the amount of courier effort expended over the period of time may be determined, and the corresponding courier pay per that period of time may also be determined.

The courier payment rate for the courier other time may be based at least in part on an amount of time that the couriers are predicted to spend waiting at the merchants while the orders are being prepared. For instance, for particular merchants, courier wait times may vary based on how busy the merchants are at different times of day, how efficient the merchants are in preparing orders, the categories of items offered by the merchants, and so forth. The courier payment rate for the courier other time may be based in part on historic courier wait times associated with the merchants in the service region, average courier wait times for particular categories of merchants in the service region, overall average courier wait times for the particular service region, and/or overall historic courier wait times for all service regions.

In some examples, the payment amounts for the courier travel time and the courier other time may be based at least in part on a target hourly rate for the couriers based on respective normalized distributions of courier travel times and courier other times determined from past orders. When a new order is received, the predicted travel time for the new delivery job and the predicted other time for the new delivery job may be determined, and the payment amount for the new delivery job may be determined as follows: (delivery job payment)=(predicted courier travel time)× (courier travel time rate)+(predicted courier other time)× (courier other time rate). In addition, the predicted wait times and courier other time distribution may be adjusted over time as new orders are fulfilled and as the actual wait times associated with these orders are used to update the courier other time predictions. Further, in some cases, the pay rate for the travel time and/or the courier other time may be adjusted based on changes in these distributions.

In some examples, when a new order is received, travel times from a courier's current location to a particular merchant pickup location and from the particular merchant pickup location to a particular delivery location may be determined based on map information and current or predicted traffic conditions, as well as weather conditions, local events, street closures, local construction, tolls, geological features, and so forth. In some implementations, the courier fleet may serve as sensors to determine current traffic conditions in the local region. As another example, the travel distances and corresponding travel times may be determined, at least in part, by consulting a web service, such as a map website, or the like. Additionally, or alternatively, the service provider may rely at least in part on historic order information to determine the predicted courier travel times. Thus, the service provider may determine, for a plurality of different times of day for a plurality of different days, and for a plurality of orders received by individual merchants over a past period of time, e.g., a past month, past two months, past year, etc., the actual travel times for delivery of orders. For instance, each courier device may include a GPS receiver or other location sensor, and the courier device may periodically provide updated location information to the service provider so that the service provider is able to track movement of active couriers over various routes throughout the service region. Accordingly, the courier fleet may provide location information that may be used to determine courier travel times based on local conditions during past delivery jobs, and may use this information to adjust travel times predicted for current conditions for a current delivery job. For instance, the service provider may receive, from a courier device, a first indication of the time at which the courier picks up the order at the pickup location, and a second indication of a time at which the courier delivers the order to the delivery location. The service provider may adjust the techniques for determining the courier travel times based on the location information received from the courier devices over time, i.e., based on the differences between predicted courier travel times and actual courier travel times.

In some examples, when a buyer places an order from a merchant and indicates a delivery location, the service provider may determine the travel distance and/or travel time from the merchant pickup location to the delivery location of the buyer, which may take into consideration current traffic conditions, current weather, and/or other local conditions. The service provider may further identify available couriers within a threshold proximity to the merchant pickup location, such as based on predicted courier travel times for individual active couriers from their respective current initial locations to the merchant pickup location. For example, the service provider may determine an item preparation time associated with the item ordered, and may only consider couriers that would be able to reach the pickup location within the item preparation time, e.g., able to reach the pickup location by the time the order is ready to be picked up. Based on the predicted courier travel times, travel distances, and other features discussed above, the service provider can determine how much to offer individual couriers for performing the delivery job and may send an offer of the delivery job, such as with a proposed payment amount, to one or more of the couriers within the threshold distance to the merchant pickup location.

As used herein, an order may include a request submitted by a buyer (e.g., a customer) for the acquisition of food items and/or other goods (referred to herein as items) from a merchant. The order information may be received by the service provider and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service provider may receive payment from a buyer for an order and the service may provide payment to the merchant for the order. Additionally, a delivery job corresponding to an order may be an assignment for a courier to pick up one or more ordered items from a merchant pick up location and deliver the one or more items to the delivery location indicated by the buyer. The service provider may provide payment to the courier for delivering the one or more items.

For discussion purposes, some example implementations are described in the environment of paying couriers based on courier effort expended for particular orders and/or for courier effort expended over time. However, implementations herein are not limited to the particular examples provided, and may be extended to other service environments, other system architectures, other techniques for determining courier effort, other payment arrangements, and so forth, as will be apparent to those of skill in the art in light of the disclosure herein.

FIG. 1 illustrates an example system 100 enabling effort-based courier payments according to some implementations. The system 100 includes one or more service computing devices 102 of a service provider 104 that may receive, over one or more networks 106, order information 108 from a plurality of buyers 110(1)-110(N). The order information 108 may include information about at least one order placed by at least one of the buyers 110. Based on the order information 108 received from a particular buyer 110, the service computing device 102 may send order information 112 to a particular merchant 114 of a plurality of merchants 114(1)-114(M). The particular merchant 114 may receive the order information 112, and may respond with confirmation information 116 to confirm that the particular order has been received and will be prepared by the particular merchant 114.

In some examples, the order information 112 sent to the merchant 114 may identify items 118 ordered by the buyers 110 from the particular merchant 114. For instance, each merchant 114(1)-114(M) may offer one or more respective items 118(1)-118(M), which may be ordered by buyers 110 for delivery. In some cases, the order information 112 may also specify a time at which the order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the order information 112 sent to the merchant 114 may include an inquiry as to when the order will be ready, and the merchant 114 may include with the confirmation information 116 a predicted time at which the order will be ready for pickup, which may correspond to the item preparation time.

In response to receiving the confirmation information 116 from the particular merchant 114, the service computing device 102 may send order information 122 to a particular courier 120 who will pick up the order from the particular merchant 114 and deliver the order to the buyer 110 who placed the order. For instance, each merchant 114(1)-114(M) may be associated with a respective pickup location 124(1)-124(M), which may typically be the merchant's place of business. Furthermore, each buyer 110(1)-110(N) may be associated with a respective delivery location 126(1)-126(N) to which the order is to be delivered.

The order information 122 sent to the courier 120 may include the pickup location 124 for the order, the pickup time, and the delivery location 126 for the order. In some examples, the order information 122 may further include a contract time, i.e., a delivery time by which the service provider 104 has agreed to have the ordered item(s) 118 delivered to the buyer 110 at the delivery location 126. Further, in some cases, the order information 122 may include an amount that the courier 120 will be paid if the courier 120 accepts the delivery job, and/or other information related to the order. For instance, as discussed additionally below, an amount of courier effort estimated for the delivery job may be used to determine, in advance, a payment amount for the delivery job. In other cases, the courier may be paid based on estimated effort expended over time.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the order information 112 via a facsimile transmission from the service computing device 102. As still another example, the merchant device 128 may be a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more of the items 118 to purchase from one or more of the merchants 114 to be delivered to the buyer 110 by one or more of the couriers 120. For example, the buyer application 134 may present one or more GUIs on a display for enabling the buyer 110 to select one or more of the items 118 for an order.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. In this case, the website may provide at least some of the functionality attributed to the buyer application herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer delivery location 126. The courier application 138 may further enable the courier 120 to respond to the service computing device 102 to confirm acceptance of a delivery job.

Additionally, in some cases, the courier application 138 may provide the service computing device 102 with an indication of a current location of a particular courier 120. For instance, one or more location sensors associated with each courier device 136 of each active courier 120 may provide location information and, based on this, the courier application 138 may send location information 139 to the service computing device 102, such as by providing an indication of a geographic location of each courier device of each active courier. Thus, a subset of courier devices 136 associated with active couriers may communicate with the service computing device 102, and may send location information 139 obtained from one or more location sensors associated with each courier device 136, such as a respective GPS receiver (not shown in FIG. 1). In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network, including fiber optics and Ethernet; or any other such network, or any combination thereof. Consequently, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the order processing functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Furthermore, based on a particular merchant 114 identified by the order information 108, the order processing module 140 may associate the order information 108 with a merchant account of a particular merchant. The order processing module 140 may access the merchant account to determine contact information for sending the order information 112 to the correct merchant device 128 so that the particular merchant can receive and provide confirmation of the order. The order processing module 140 may further access the merchant account of the particular merchant to credit payment to the particular merchant that prepares the ordered item.

In addition, the order processing module 140 may access courier information 146 to determine courier contact information for sending the order information 122 to a particular courier 120 of the plurality of couriers 120(1)-120(L) to determine whether the particular courier 120 will accept the delivery job of delivering the order to the buyer. The particular courier 120 may use the courier application 138 on the courier device 136 to receive a message with information about the order, and to respond with acceptance of the delivery job if the job assignment is accepted. The particular courier 120 may subsequently pick up the order from the particular merchant 114 and deliver the order to the particular buyer 110 at the indicated delivery location 126. When the courier 120 has completed delivery of the order to the delivery location 126, the courier 120 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as past order information 148. For instance the past order information 148 may include a day of the week, date, and time of day at which each order is received from the respective buyer 110, picked up from the merchant, and delivered to the delivery location. The past order information 148 may further include, for each order: merchant identifying information; buyer identifying information; items ordered; the pickup location 124; the delivery location 126; preparation time and courier wait time for the order; location of the courier when the courier accepted the job for delivery of the order; predicted spoilage time for one or more items included in the order; time that the courier arrived at the pickup location; time that the courier left the pickup location; time that the courier arrived at the delivery location; time that the courier left the delivery location; amount paid for the order; feedback, including any complaints or indications of item spoilage; as well as other information, as discussed additionally below.

The service computing device 102 may further include an effort determination module 150 that may be executed by the service computing device 102 to determine courier effort associated with individual delivery jobs corresponding to individual orders, and which may further determine effort-based payment for couriers. For example, the effort determination module 150 may quantify the amount of courier effort for delivery jobs based on one or more order features that are indicative of courier effort. As mentioned above, the effort determination module 150 may normalize values determined for the one or more features for large number of past delivery jobs to generate a normalized distribution curve, and may further associate the normalized distribution curve with a courier payment amount. When a new order is received by the order processing module 140, the order information may be provided to the effort determination module 150. The effort determination module 150 may determine the values associated with each order feature for the new order and, based on the normalized distribution curve, may determine a corresponding amount of courier effort that is predicted to be required for a courier to deliver the new order.

Additionally, or alternatively, in some examples, the effort determination module 150 may use courier time as the primary feature for determining courier effort. Further, effort determination module 150 may divide the courier time into two categories: courier travel time and courier other time. The courier travel time may include the time that a courier spends traveling from an initial location at which the courier receives a job assignment to a merchant pickup location, and the time that the courier spends traveling from the merchant pickup location to the delivery location. A first courier payment rate may be associated with the courier travel time. The courier other time may include all other courier time that is associated with the order and that is not courier travel time, such as time spent going into the merchant's place of business to pick up the item, or time spent otherwise waiting for the item to be prepared, as well as time spent going from the courier's vehicle to the buyer's door, time spent interacting with the buyer, or time otherwise spent handing off the item at the delivery location. A second courier payment rate may be associated with courier other time. Accordingly, the effort determination module 150 may determine the amount of courier effort expended for a particular job and the corresponding courier payment amount based on the amount of courier travel time and courier other time for a particular delivery job. Further, in some examples, the effort determination module 150 may determine the corresponding courier pay over a period of time based on the amount of courier travel time and the amount of courier other time during that period of time.

In some cases, values for the features associated with a new delivery job, including the courier travel time, may be determined based at least on part on current local conditions, such as current traffic, current weather, current local events, current road closures, construction, and so forth. Accordingly, the effort determination module 150 may obtain, from one or more web servers 152 or other network locations, map information and/or local conditions information 154, such as current traffic, weather, events, etc., as enumerated above. Additionally, or alternatively, the traffic information may be determined at least in part based on the location information 139 received from the courier devices 136 of a plurality of couriers that are currently active in the service region. Based on the local condition information 154 and/or the courier indicated traffic conditions, the effort determination module 150 can more accurately determine courier travel times and other effort-based features for the current delivery job, which may then be used, e.g., for determining a corresponding point on the normalized distribution generated from past delivery jobs, which may include delivery jobs performed under similar local conditions.

Figure 2:
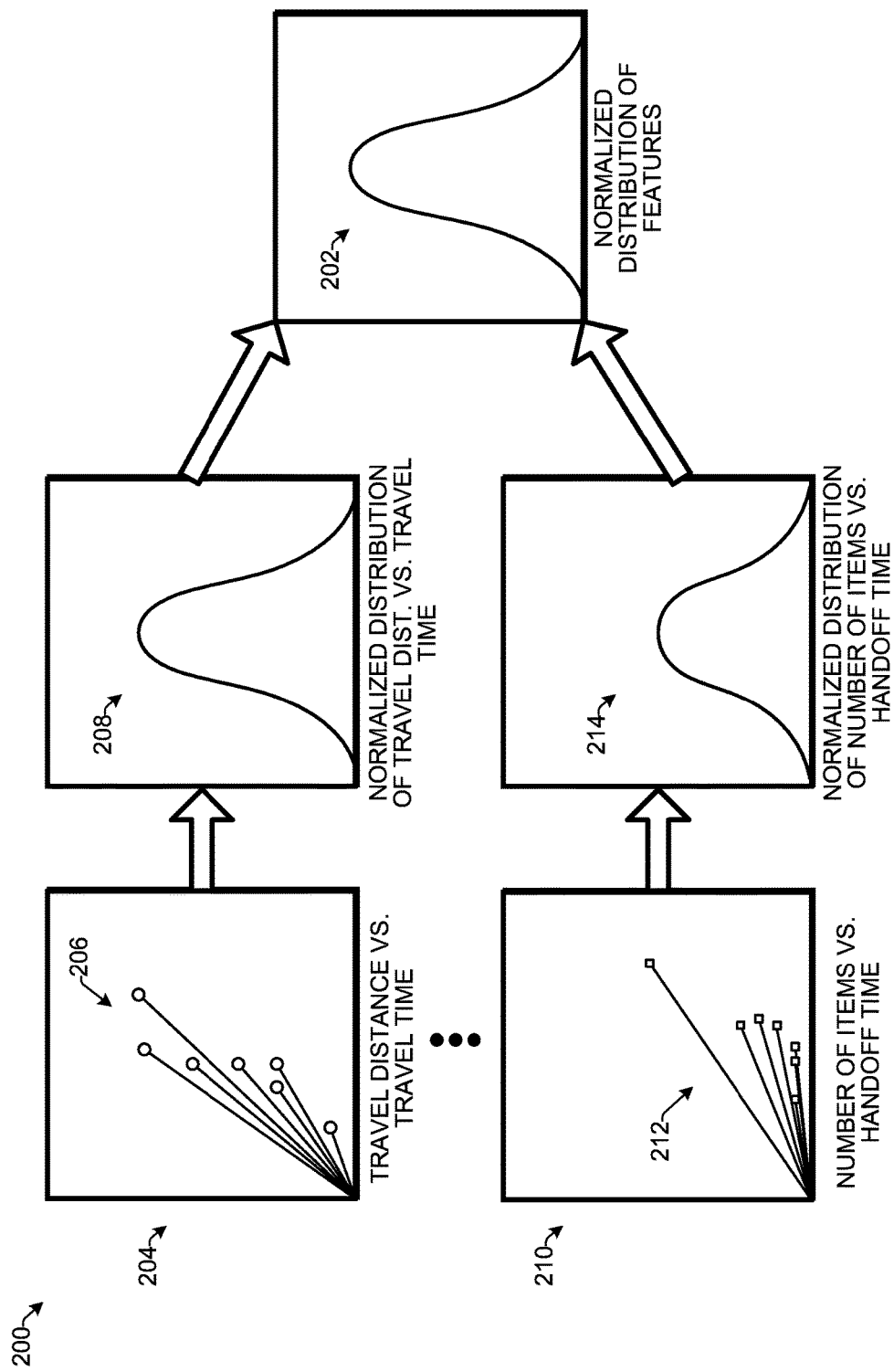
FIG. 2 illustrates an example of generating a normalized distribution of features according to some implementations.

FIG. 2 illustrates an example 200 of generating a normalized distribution curve 202 according to some implementations. In this example, one or more features from a plurality of past delivery jobs may be used to generate the normalized distribution curve 202. As mentioned above, examples of such features for quantifying courier effort may include the distances to be traveled to pick up the order and deliver the order; the amount of courier travel time predicted to be required to pick up the order and to deliver the order; the number of items to be delivered; the type or category of item to be delivered; a courier wait time, e.g., the amount of time the courier may spend at the merchant picking up the order or waiting for preparation of the order; a courier handoff time, e.g., the amount of time the courier may spend dropping off the order after arriving at the delivery location; courier vehicle type; how busy a particular merchant is when the order is placed; accessibility of the buyer delivery location; accessibility of the merchant pickup location; whether there are multiple merchants, multiple orders, and/or multiple buyers for a particular delivery job; and so forth. Thus, in some cases, for each order, the same features may be taken into consideration for determining courier effort associated with that order, with the values of the features also varying from order to order based on various considerations such as current regional conditions (e.g., traffic, weather, local events).

Additionally, in some examples, features may be combined, segmented, and/or weighted. For example, a distribution of delivery travel times may be determined for delivery jobs that were performed during particular times of day and days of the week, particular weather conditions, traffic conditions, local conditions, and the like. Further, delivery travel time may be weighted higher than other features, such as the number of items in an order or the category of items in an order. For instance, the weighting may be based on, from a total amount of time spent on delivery jobs, the average percent of time spent traveling from pickup locations to delivery locations vs. the average percent of time spent during pick up and/or drop off. As an example, if delivery travel time is 80 percent of the time spent in a typical order, with 10 percent of time being spent on pick up and 10 percent of time being spent on drop off, then delivery travel time and similar features, such as travel distance, may have a weighting of "0.8", while features associated with pick up or handoff, e.g., number of items, type of items, etc., might only have a weighting of "0.1". Of course, other weightings, or no weightings, may be applied, with the foregoing being merely one example for discussion purposes.

In the illustrated example, a first feature 204, travel distance vs. travel time per delivery job, includes a plurality of data points from a plurality of past delivery jobs. For example, for a large number of past delivery jobs, the travel distance from the merchant pickup location to the delivery location vs. the courier travel time for each of these jobs delivery jobs may be plotted as a plurality of first data points 206, and these data points 206 may be used to generate a normalized distribution curve 208 that is representative of the normalized distribution of travel distance versus travel time. Similarly, others of the above-mentioned features may also be normalized to generate other normalized distribution curves. For instance, a second feature 210, e.g., the number of items in an order versus the handoff time required for the order, may be represented as a plurality of data points 212 for a large number of orders. The plurality of data points 212 may be normalized to generate a second curve 214 representative of a normalized distribution of the number of items versus the handoff time.

The normalized distribution curves 208 and 214 generated from multiple different features 204 and 210 may be combined to generate the normalized distribution curve 202 for multiple features. As mentioned above, in some cases the distributions of multiple features may be combined without weighting, while in other examples of different weightings may be applied to the distribution curves 208 and 214 of different features when combining the distribution curves 208 and 214 to create the normalized distribution curve 202 of multiple features. Further, while the illustrated example combines two features 204 and 210 representative of courier effort, in other examples, any number of the features mentioned above might be combined to generate the normalized distribution curve 202.

In some examples, the normalized distribution curve 202 intrinsically takes into consideration different hours of the day, different days of the week, and local conditions, such as traffic, weather, road closures, and the like. For example, courier travel times may vary widely depending on traffic conditions in the service region, which may in turn vary based on time of day, day of the week, weather, road closures, and the like. Accordingly, when determining values of the features for a newly received order/delivery job, time of day, day of the week, and the current local conditions may be considered, and then the values determined for the various features for the new delivery job may be used for determining where the new delivery job falls on the normalized distribution curve 202.

Figure 3:
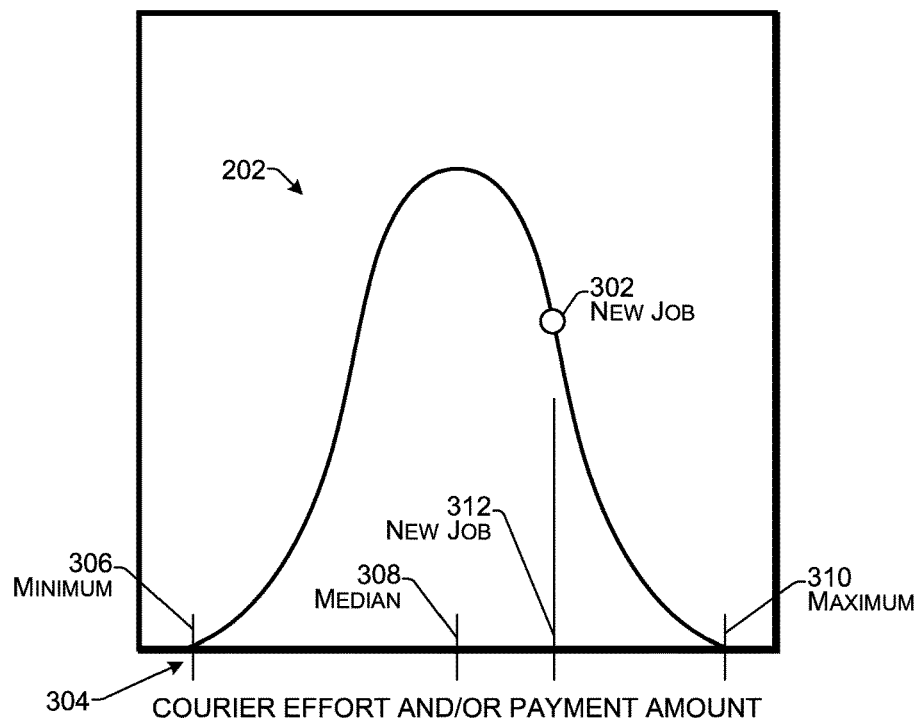
FIG. 3 illustrates an example normalized distribution curve for determining courier effort and/or payments according to some implementations.

FIG. 3 illustrates an example 300 of using the normalized distribution curve 202 for determining an amount of courier effort and/or courier payment for a particular delivery job according to some implementations. For instance, the normalized distribution curve 202 may be associated with a courier payment amount. In some examples, the payment amount may be a target payment that a courier is to be paid for a delivery job requiring a median amount of courier effort. In other examples, the median payment amount 302 may be a targeted hourly rate to be paid to the couriers.

When a new delivery job corresponding to a new order is received by the service computing device, the effort determination module may determine where the new delivery job falls on the normalized distribution curve 202. For instance, the effort determination module may determine values for the various features of the new delivery job, such as travel distance and/or travel time, the number of items, the type of items, predicted courier wait time, etc., and may further determine these values based on current traffic conditions, current weather, and so forth. Based on the values determined for the various features of the new delivery job, the effort determination module may determine a corresponding point 302 on the normalized distribution curve 202. Further, if feature weightings were used when generating the normalized distribution curve 202, the same feature weightings may be used when determining where the point 302 falls on the normalized distribution curve 202.

The point 302 may then be correlated to a scale 304 along a bottom axis that may correspond to at least one of courier effort or courier payment amounts. For example, the scale 304 may include a minimum value 306, a median value 308, and a maximum value 310. The point 302 may correlate to a new job value 312 on the scale 304, e.g., between the median value 308 and the maximum value 310 in the illustrated example. Accordingly, depending on the values assigned as the minimum value 306, the median value 308, and the maximum value 310, the new job value 312 corresponding to the new job point 302 may be quantified, and thereby the effort for the new delivery job and/or the amount of payment for the new delivery job may be quantified.

As one example, suppose that a payment value of $15 is assigned as the median value 308, with $5 being the minimum value 306, and $25 being the maximum value 310.

Accordingly, the payment amount for the new job at 312 may be determined to be, e.g., $18.50 on the scale 304. As another example, levels of effort may be similarly established, such as on a scale of 0 to 10, with the minimum value 306 being equal to 0, the median value 308 being equal to 5, the maximum value 310 being equal to 10. Thus, the level of effort required for the new job at 312 may be determined to be, e.g., an effort level of 7. The level of effort may be subsequently equated to a payment amount for the courier. Furthermore, while several examples of quantifying effort and or payment based on delivery job features are discussed above, numerous other examples will be apparent to those of skill in the art having the benefit of the disclosure herein.

Figure 4:
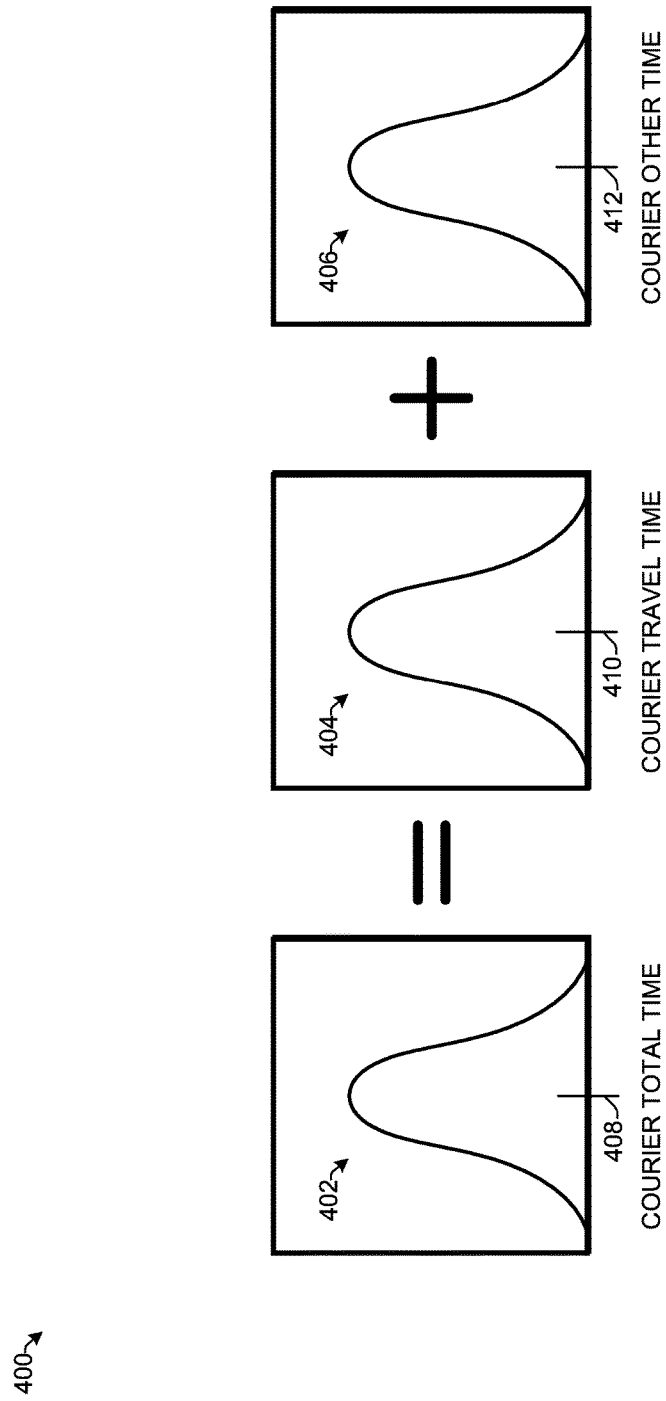
FIG. 4 illustrates example normalized distribution curves for determining courier effort and/or payments according to some implementations.

FIG. 4 illustrates an example 400 of determining courier effort according to some implementations. In the example of FIG. 4, rather than using multiple order features, the amount of courier time expended may be the main feature considered for determining courier effort. A normalized distribution 402 of the total time expended by couriers during past orders may include two time components: a normalized distribution 404 of courier travel time and a normalized distribution 406 of other courier time. The courier travel time may include the time that a courier spends traveling to a merchant pickup location from an initial location at which the courier is located when the courier receives a job assignment. The courier travel time may further include the time that the courier spends traveling from the merchant pickup location to a delivery location. Alternatively, in other examples, the courier travel time might not include the travel time from the initial location to the merchant pickup location, and this time might instead be included in the courier other time.

The courier other time may encompass the courier time associated with an order that is not the courier travel time, e.g., time during which the courier is waiting at the merchant for the item to be prepared, and time after the courier arrives at the delivery location, such as time that the courier spends handing off the order to the buyer or otherwise interacting with the buyer. The amount of time that the couriers spend waiting at the merchants while the orders are being prepared may be a primary component of the courier other time. For each of the merchants, the courier wait times may vary based on how busy the merchants are at different times of day, how efficient the merchants are in preparing orders, and so forth. Thus, the normalized distribution 406 of courier other time per order may be based in part on historic courier wait times associated with the merchants in the service region. In addition, the courier wait times and the corresponding courier other time distribution 406 may be adjusted over time as new orders are fulfilled and the wait times associated with these new orders are used to update the courier other time distribution 406.

The normalized distribution 402 for courier total time may have a median 408 that is equal to the sum of a median 410 of the normalized distribution 404 for the courier travel time and a median 412 of the normalized distribution 406 for the courier other time. The courier travel time distribution 404 may intrinsically take into consideration time of day and day of the week, traffic, weather, and other local conditions, courier vehicle type, as well as distances from the initial courier location to the pickup location and from the pickup location to the delivery location. Similarly, the courier other time distribution 406 reflects time spent waiting for orders to be prepared, time spent handing off the order, and any other courier time associated with an order that is not travel time.

Features relevant to the courier other time distribution 406 may include wait times associated with individual merchants at different times of day, and different days of the week. For example, the hour of the day generally indicates the length of the courier wait time, i.e., orders placed during lunch rush or dinner rush may have increased wait times as compared with orders to be fulfilled during other times of day. Similarly, some merchants have longer item preparation times than other merchants, which result in longer courier wait times, and this information may be determined from the merchants and/or from order history of past orders prepared by the individual merchants.

A first courier payment rate may be associated with the courier travel time and a second courier payment rate may be associated with courier other time. As an incentive to encourage courier effort, the first courier payment rate may be higher than the second courier payment rate. The payment rate for the courier other time may be determined based on the relative values (e.g., in minutes) of the median 410 and the median 412. Further, in some examples, the payment amounts for the courier travel time and the courier other time may be based at least in part on a target hourly rate for the couriers based on respective normalized distributions 404 and 406 of courier travel times and courier other times determined from past orders. For instance, if the target hourly rate is X dollars, then the first courier payment rate and the second courier payment rate may be determined such that (the first courier payment rate×median 410)+(the second courier payment rate×median 412)=X dollars. Further, as mentioned above, the first courier payment rate for courier travel time may be substantially higher than the second courier payment rate for courier other time, such as by a factor of 2, 4, 6, or the like. The target hourly rate may be selected or adjusted based on, e.g., profitability of the service for service region, or other suitable revenue model of the service for the service region.

A total payment amount to be paid to a courier for a new order/delivery job may be determined based on predicted courier travel time and predicted courier other time for the new order/delivery job. For instance, when a new order is received, the predicted travel time for the new delivery job and the predicted other time for the new delivery job may be determined, as discussed additionally below, and the payment amount for the new delivery job may be determined as follows: (delivery job payment)=(predicted courier travel time)×(courier travel time rate)+(predicted courier other time)×(courier other time rate). Alternatively, as another example, based on an amount of courier travel time and courier other time attributable to a particular courier over a particular period of time, e.g., per hour or per day, the total amount of courier effort expended over the period of time may be determined, and the corresponding courier pay per that period of time may also be determined.

In some examples, when determining the courier other time for a newly received order, the wait time component is determined based on a history of past orders fulfilled by the particular merchant specified in the new order. Further, the number of past orders by the particular merchant may be required to be above a threshold order count number, e.g., 10-15 orders, to ensure that the average wait time associated with the particular merchant is reasonably accurate. Thus, when determining the wait time associated with the particular merchant, if the number of past orders fulfilled by the particular merchant is below the threshold number, the effort determination module may refer instead to an average wait time for merchants that are similar to the particular merchant, e.g., categorized in a same merchant category. If this information is not available, the effort determination module may use the average courier wait time for the service region in general, or the average wait time across the service overall, e.g., all service regions.

Figure 5:
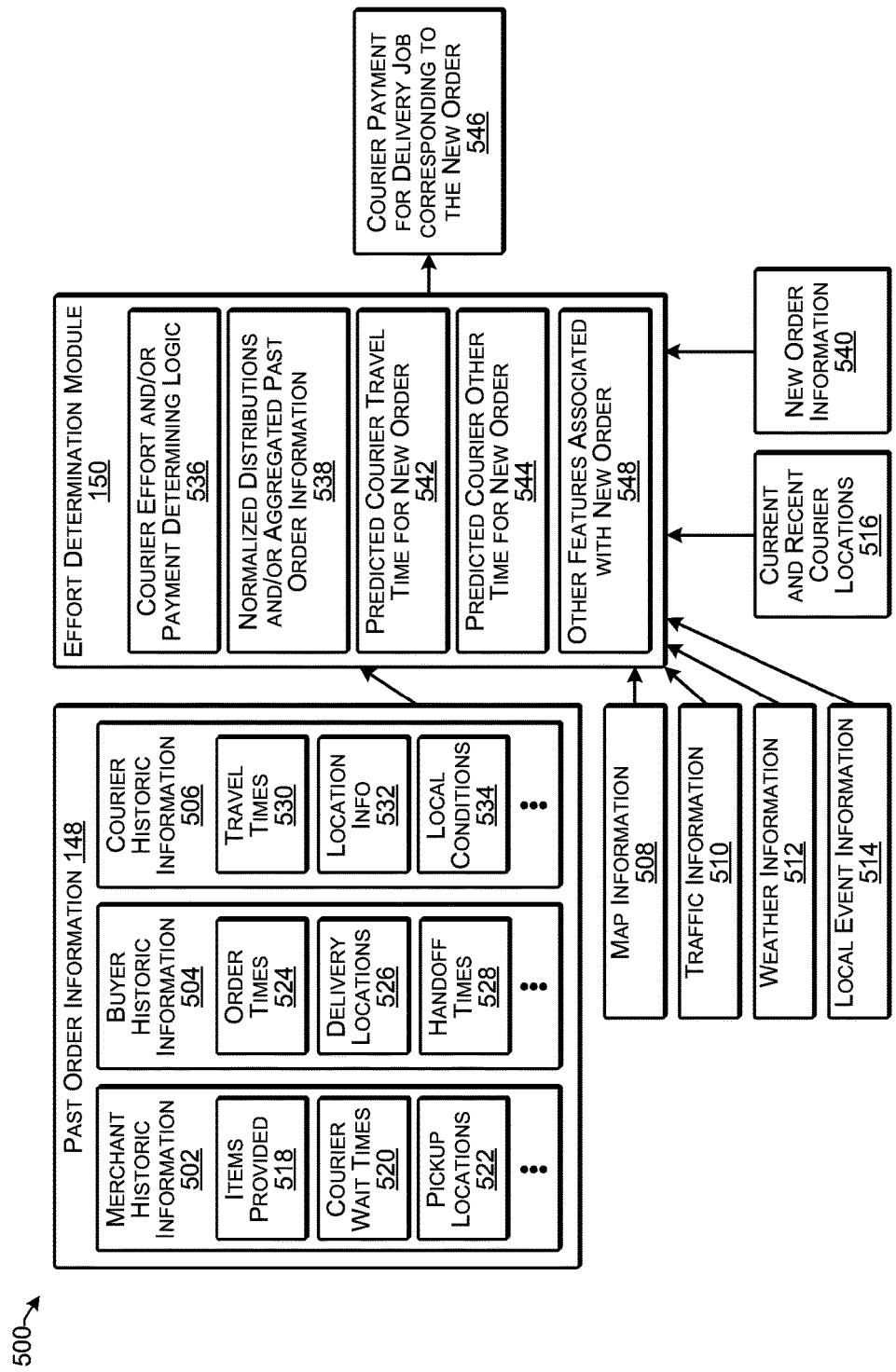
FIG. 5 is a block diagram illustrating an example framework for determining courier payments according to some implementations.

FIG. 5 is a block diagram illustrating an example framework 500 for determining courier effort and/or courier payments according to some implementations. In this example, the effort determination module 150 may receive the past order information 148 including merchant historic information 502, buyer historic information 504, and courier historic information 506. In addition, the effort determination module 150 may receive map information 508, traffic information 510, weather information 512, local event information 514, and/or current and recent courier location information 516. Further, while several types of information that may be used by the effort determination module 150 are illustrated, in other examples, other or additional types of information may be used by the effort determination module 150, as discussed herein and/or as will be apparent to those of skill in the art having the benefit of the disclosure herein.

The merchant historic information 502 includes historic order information related to the merchants, e.g., various types of information related to past orders filled by the merchants that participate in the service of the service provider 104. For instance, the merchant historic information 502 may include items provided 518 by each merchant at particular times on particular days of the week, particular dates, and the like. Further, the merchant historic information 502 may include courier wait times 520 for orders filled by each merchant and the pickup locations 522 associated with each merchant. As one example, the courier wait times 520 may be determined based at least in part on location information received from the courier device of a courier assigned to an order. For instance, the effort determination module 150 may note a first time at which the location information received from the courier device indicates that the courier has arrived at the merchant pickup location, and may further note a second time at which the location information received from the courier device indicates that the courier is leaving the merchant pickup location. The effort determination module 150 may determine the courier wait time for that order based on the difference between the first time and the second time. Accordingly, a plurality of courier wait times 520 may be associated with each merchant for a plurality of orders fulfilled by each merchant. From this, an average wait time for the merchant may be established.

Additionally, the buyer historic information 504 includes historic order information related to the buyers. Examples of buyer historic information 504 may include order times 524, e.g., a time of day, day of the week, and date on which each order was placed. The buyer historic information 504 may further include delivery locations 526 to which each order was delivered, and handoff times 528. For instance, the handoff times 528 may be determined based at least in part on location information received from the courier devices of the couriers. For instance, for a particular delivery job, the effort determination module 150 may note a first time at which the location information received from the courier device indicates that the courier has arrived at the delivery location, and may further note a second time at which the location information received from the courier device indicates that the courier is leaving the delivery location. Thus, the effort determination module 150 may determine the handoff time 528 for the particular delivery job based on the difference between these two times. The effort determination module may associate the handoff times 520 with particular delivery locations and/or particular buyers as orders are fulfilled.

Further, the courier historic information 506 includes historic order information related to the couriers. For example, the courier historic information 506 may include courier travel times 530, which may indicate the time that an order was assigned, the time that the order was picked up, and the time that the order was delivered, e.g., how long it took each courier to arrive at the pickup location after being assigned an order, and how long it took to arrive at the delivery location after picking up the order from the merchant's pickup location. Additionally, location information 532 may include locations of individual couriers at different times of day, for different days of the week in different parts of the service region. For instance, the courier location information 532 may indicate speeds at which couriers are able to travel on different streets in the service region at different times of day, thereby providing an indication of traffic information and an indication of predicted courier travel times at different times of day and one different days of the week. The location information 532 may further indicate when the courier is at the pickup location, when the courier is at the delivery location, and how far each courier had to travel after picking up each order to make delivery of the order. In addition, the courier historic information 506 may include local conditions 534, such as traffic conditions and weather conditions when particular orders were fulfilled, information regarding any local events taking place within the service region when the orders were fulfilled, street closures, and the like. Furthermore, the merchant historic information 502, the buyer historic information 504, and the courier historic information 506 may include additional types of information, with the foregoing being merely several examples of the types of information that may be used by the effort determination module 150.

In some examples, the effort determination module 150 may employ courier effort and/or payment determining logic 536 for determining courier effort and/or corresponding courier payment for one or more delivery jobs corresponding to one or more respective orders. For instance, the courier effort and/or payment determining logic 536 may include one or more algorithms, one or more computational models, a plurality of decision-making rules, or the like, configured to determine normalized distributions and/or aggregated past order information 538, such as discussed above, e.g., with respect to FIGS. 2-4. Further, when new order information 540 is received for a new order, the courier effort and/or payment determining logic 536 may obtain or otherwise determine predicted courier travel time 542 for the new order and predicted courier other time 544 for the new order.

In some examples, the predicted courier travel time 542 may be obtained from a mapping website as part of the map information 508. For instance, the courier effort and/or payment determining logic 536 may provide the current courier location, the merchant pickup location, and the delivery location to the mapping website, and may receive the predicted courier travel times from the current location to the pickup location, and from the pickup location to the delivery location. Additionally, or alternatively, in other examples, courier effort and/or payment determining logic 536 may include one or more computational models for determining predicted courier travel times to the merchant pickup location, and from the merchant pickup location to the delivery location. The predicted courier travel times 538 may be based in part on the courier historic information 506, such as based on courier location information 532 that indicates courier movement within the service region at particular times, on particular days, on particular dates, during particular types of weather, or while other local conditions 534 are in effect.

As one example, the courier effort and/or payment determining logic 536 may determine a confidence score for a prediction of how long it will take a courier to travel from a first point to a second point within the service region at a particular time on a particular day of the week. The current and recent courier location information 516 may also be considered when determining the predicted courier travel times. For example, recent courier movement, or lack thereof, may indicate traffic conditions. Additionally, in some examples, the map information 508 and/or the traffic information 510 from an online map service, such as may be obtained from a webserver or other network source, may also be taken into consideration in combination with the output of the computational model when determining the predicted courier travel times.

As another example, the courier travel times received from the mapping website may be adjusted by the courier effort and/or payment determining logic 536 based on the actual travel times 530 in the courier historic information. For instance, if a comparison of the courier travel times received from the mapping website with the actual travel times for a plurality of past orders show that the courier travel times received from the mapping website typically underestimate the actual travel time by 10%, then the courier effort and/or payment determining logic 536 may add 10% to the courier travel times received from the mapping website when determining the predicted courier travel time 542 for a new order.

As still another example, in the case that the effort determination module 150 determined courier travel times based on location information received from the courier devices, the courier effort and/or payment determining logic 536 may receive, from a courier device, an indication of a time at which the courier picks up an order from a pickup location and a time at which the courier delivers the order to the delivery location. The courier effort and/or payment determining logic 536 may adjust the technique for determining the courier travel times based on this information. For example, if the actual courier travel time is different from that predicted by the computational model or other effort determining logic, the courier effort and/or payment determining logic 536 may adjust the computational model or other logic to predict courier travel times more accurately.

Similarly, the courier effort and/or payment determining logic 536 may use one or more algorithms, computational models, or the like, for predicting the predicted courier other time 544 for a new order, such as based on past courier wait times 520 for a particular merchant and past handoff times 528 for particular buyers and/or delivery locations. For instance, if the order count of past orders for the particular merchant exceeds a threshold number, the courier effort and/or payment determining logic 536 may use the average courier wait time for the particular merchant when determining the wait time portion of the predicted courier other time 544 for the new order. Accordingly, when the new order information 540 is received by the effort determination module 150 for a newly received order, the courier effort and/or payment determining logic 536 may determine the corresponding predicted courier travel time 542 and the predicted courier other time 544 for the new order.

In some cases, the one or more computational models used by the courier effort and/or payment determining logic 536 may include one or more trained statistical models that account for numerous pieces of information included in the past order information 148, as well as current information, such as time, day and date information, map information 508, traffic information 510, weather information 512, local event information 514, current and recent courier locations 516, and the like, when determining the predicted courier travel times 542 and the predicted courier other time 544. In some cases, the one or more statistical models may be initially trained using a set of training data, checked for accuracy, and then used for predicting at least one of the predicted courier travel times 542 or the predicted courier other time 544 based on a confidence score exceeding a specified threshold of confidence. The one or more statistical models may be periodically updated and re-trained based on new training data to keep the one or more models up to date and accurate. Examples of suitable statistical models that may be employed herein may include regression models, such as linear and nonlinear regression models, and stochastic models, such as Markov models, hidden Markov models, and so forth. Additionally, while a computational model and/or statistical model has been described as one example of a technique for determining the predicted courier travel times 542 and/or the predicted courier other time 544, numerous other techniques, algorithms, decision-making rules, and the like, may additionally or alternatively be used for determining this information. Accordingly, implementations herein are not limited to use of a computational model, statistical model, or the like.

In some examples, the courier effort and/or payment determining logic 536 may use the predicted courier travel time 542 and the predicted courier other time 544 for determining a courier payment 546 for delivering the new order. For instance, the courier payment 546 for the delivery job corresponding to the new order may be determined as follows: (delivery job payment)=(predicted courier travel time)×(courier travel time rate)+(predicted courier other time)×(courier other time rate). As discussed above, e.g., with respect to FIG. 4, the courier travel time rate and the courier other time rate may have been determined in advance, such a based on a target courier pay rate or a target revenue model of the service for the service region. Thus, after the predicted courier travel time 542 and the predicted other time 544 for the new order have been determined, the courier payment 546 for the delivery job may be determined and sent to a selected courier to whom the delivery job has been assigned. Thus, implementations herein may determine a payment amount for a delivery job in advance based on an amount of effort that is predicted to be expended by the courier that performs the delivery job.

When determining the predicted courier other time 544 for a new order, the predicted courier other time 544 may be based at least in part on historic courier wait times associated with the particular merchant selected by the buyer. Further if there is not sufficient historic information for the particular merchant (e.g., the past order count for the merchant is fewer than 10 or 15 past orders, or other suitable threshold), the courier effort and/or payment determining logic 536 may determine historic wait times at other merchants in the same service region and in the same merchant category as the particular merchant. For example, if the selected merchant is a pizza restaurant, the courier effort and/or payment determining logic 536 may determine average historic wait times for other pizza restaurants in the service region, and may use this average courier wait time as the courier wait time component of the predicted courier other time 544. Further, if there are insufficient order counts for the merchant category, the courier effort and/or payment determining logic 536 may determine the average wait time for couriers at all merchants in the service region, and/or may use an overall average courier wait time for all service regions as the wait time component when predicting the predicted courier other time 544. Additionally, in some examples, a predicted item preparation time may be received by the service computing device from the merchant device, and this predicted item preparation time may also be taken into consideration when determining the courier wait time component of the predicted courier other time 544.

Similarly, when determining the predicted handoff time component of the predicted courier other time 544, if a threshold number of orders have been delivered to the particular delivery location, the courier effort and/or payment determining logic 536 may use the average handoff time associated with the particular delivery location, rather than an average handoff time for the service region. For instance, if there have been more than a threshold number (e.g., 5 or 10) of orders delivered to the delivery location, and the average handoff time for these orders differs from the average handoff time for the service region, the courier effort and/or payment determining logic 536 may use the historic average handoff time for the particular delivery location when determining the predicted courier other time 544. On the other hand, if there are fewer than the threshold number of past order associated with the delivery address, the predicted handoff time may be the average handoff time for the service region or for the service in general.

As mentioned above, the courier location information sent from the courier devices to the service computing device may be used to determine the courier wait times 520 and/or the handoff times 528. In some examples, the courier application may automatically send courier location information to the effort determination module on a periodic basis while the associated courier is on-duty or otherwise active. Alternatively, the effort determination module 150 may periodically ping the courier devices of active couriers to determine the couriers' current locations. Each courier device may include one or more location sensors, such as a GPS receiver, and/or communication interfaces that can determine (e.g., from cell towers or wireless access points) a geographic location of the courier device. Thus, the effort determination module 150 may continually receive courier location information from the courier device, such as every 10 seconds, every 30 seconds, every minute, every 2 minutes etc., and may continually update the courier location with respect to map information 508.

Additionally, or alternatively, the courier application may send location information whenever acceleration of the courier device exceeds a threshold level, or the like, which may indicate starting, stopping, or other movement by the courier. Accordingly, the effort determination module 150 may continuously track the courier's location, such as for determining initial movement toward the merchant pickup location following assignment of a delivery job, arrival at the merchant pickup location, departure from the merchant pickup location, arrival at the delivery location and departure from the delivery location. Based on this location information provided by the courier devices, the effort determination module 150 may determine courier wait times 520 and handoff times 528 associated with each order.

In addition, the normalized distributions of courier travel time and courier other time may be recalculated and adjusted over time as new orders are fulfilled and the actual travel times, wait times, and handoff times associated with these orders are received. For example, if the courier travel time and/or courier other time is reduced overall (i.e., the median point of the distribution moves to the left), then the payment rates for these times may be reduced without reducing the actual compensation paid to the couriers. One technique for accomplishing movement of the medians to the left is incentivizing local ordering, which may increase profits by reducing courier travel time and increasing the number orders each courier is able to deliver per hour. As one example, when presenting a list of merchants to a buyer, the merchants closest to the delivery location of the buyer may be presented first, or may be presented with a reduced delivery fee or other incentive to encourage the buyer to order from merchants closer to the delivery location. Further double orders may result in incrementally larger payment to the couriers based on the additional travel time and/or based on other incentives. Thus the couriers may be paid based on effort predicted to be expended, as determined based on the amount of time predicted to be spent for travel time and the amount of time predicted to be spent as courier other time, rather than being paid at a flat hourly rate or a flat per-order rate.

Additionally, in some examples, as discussed above with respect to FIGS. 2 and 3, the courier effort and/or payment determining logic 536 may determine other features 548 associated with a new order in addition to, or as an alternative to, the predicted courier travel time 542 and the predicted courier other time 544. For example, a normalized distribution may be generated based on a plurality of features of past orders, such as distances, number items, type of items, merchant location, buyer location, wait times, handoff times, etc., as enumerated above. When the new order information 540 is received, values for these other features 548 may be also be determined for the new order, and the normalized distribution may be used to determine the courier payment 546 for the delivery job corresponding to the new order.

After the courier payment 546 has been determined, the courier payment amount for the newly received order may be sent to a courier device of a selected courier along with other order information, such as pickup location and delivery location. Thus, the courier may be presented with the payment amount for the order along with the other order information, such as in a GUI presented on the courier device. In some examples, the courier may have the option of accepting or refusing to accept the delivery job assignment, and may be able to base that decision at least in part on the payment amount included with the order information. For instance, the courier may make a user input to the courier device to accept the delivery job, and the courier device may send this indication of acceptance to the service computing device.

Figure 6:
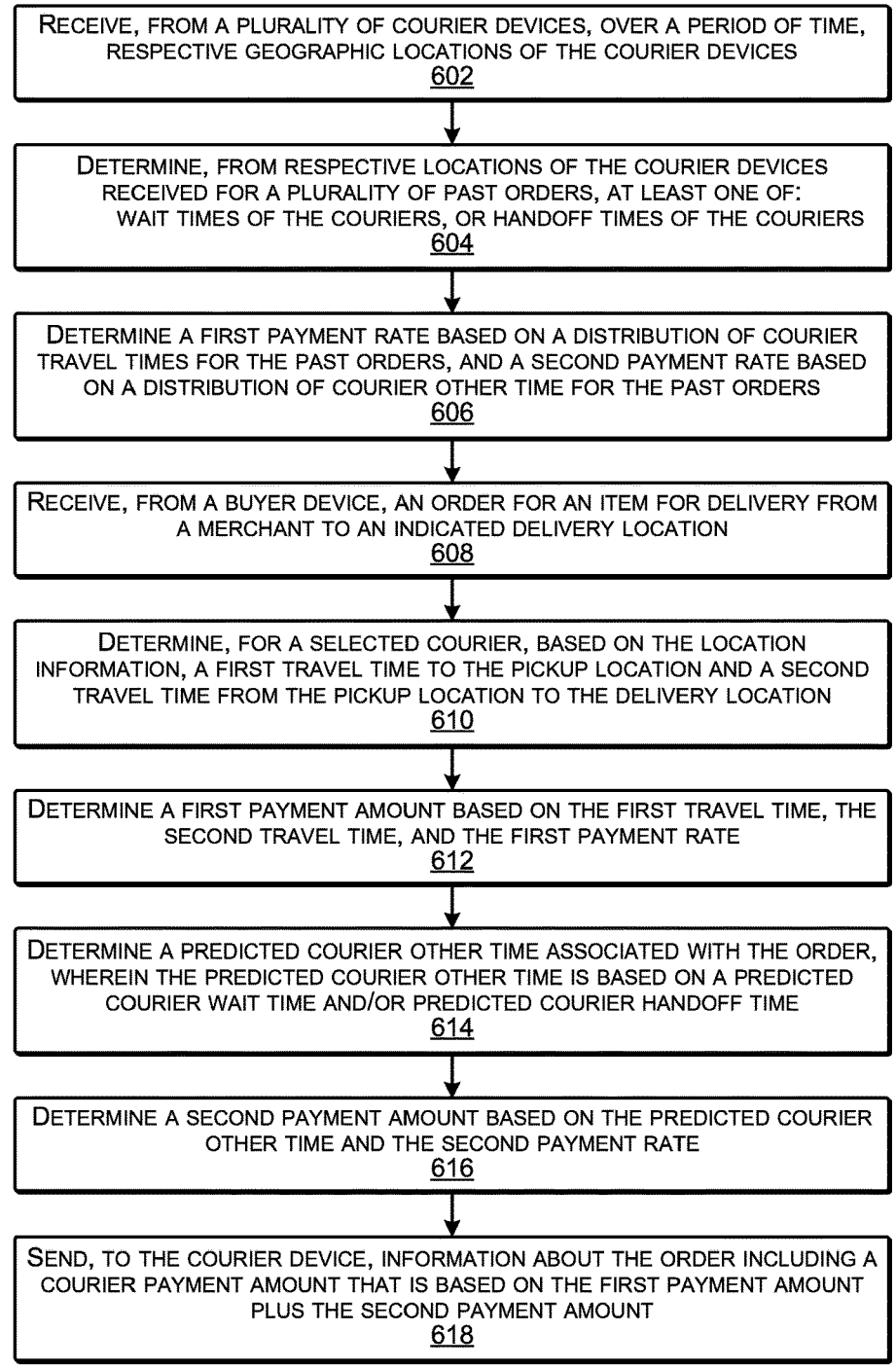
FIG. 6 is a flow diagram illustrating an example process for determining courier payments based on effort according to some implementations.
Figure 7:
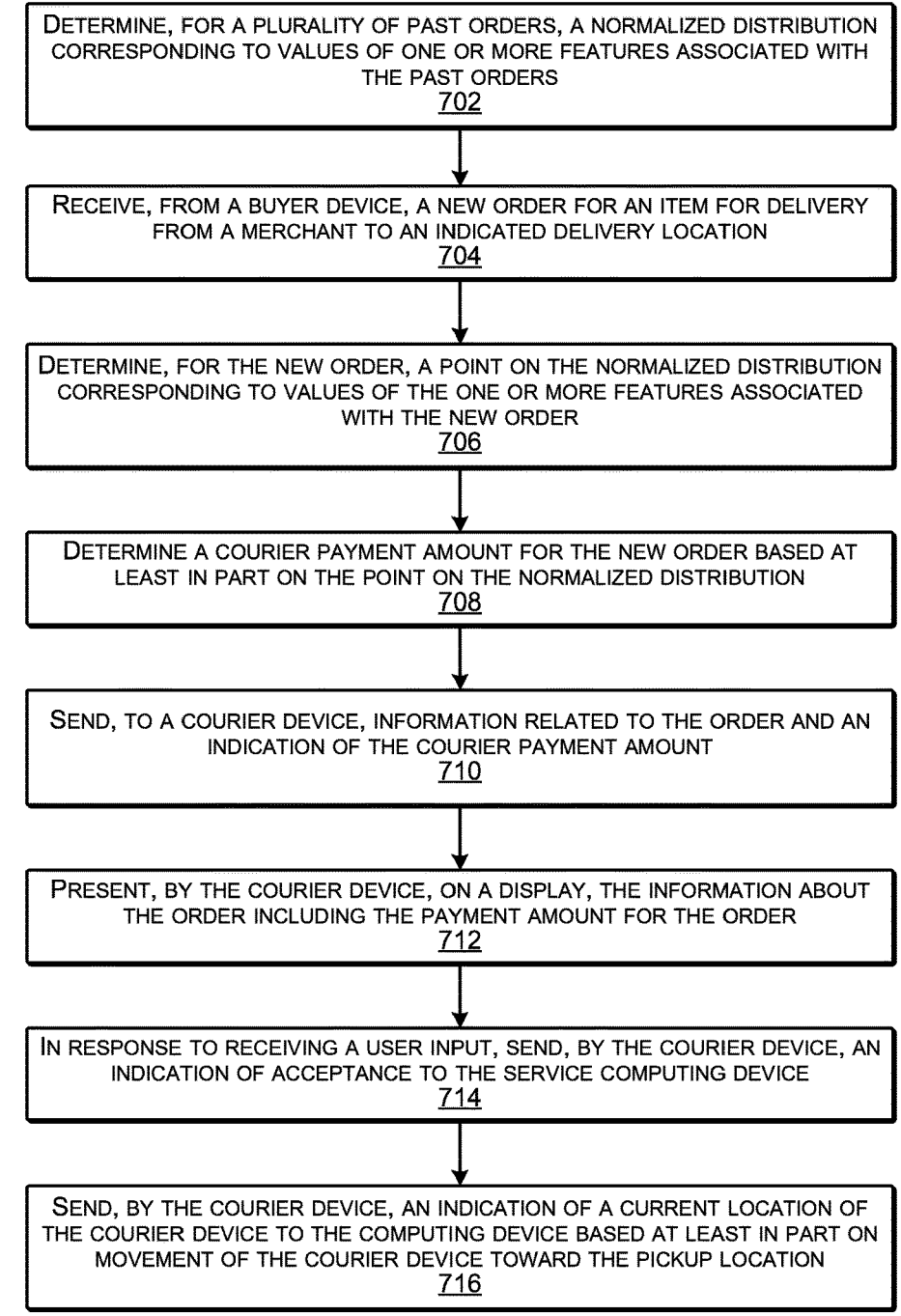
FIG. 7 is a flow diagram illustrating an example process for determining courier payments based on effort according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 for determining courier payments based on effort according to some implementations. In some examples, the process may be executed in part by the service computing device 102 or by another suitable computing device, and in part by the courier devices 138.

At 602, the computing device may receive, from a plurality of courier devices, over a period of time, respective indicated geographic locations of the courier devices. For example, the computing device may receive from a plurality of courier devices associated with a plurality of couriers, respective electronic communications indicating respective indicated locations of the courier devices based at least in part on respective geographic locations of the courier devices determined through information from respective courier device GPS receivers.

At 604, the computing device may determine, from respective indicated locations of the courier devices received for a plurality of past orders, at least one of wait times of the couriers, or handoff times of the couriers. For example, the computing device may determine a wait time based at least in part on when a courier arrives at and leaves a pickup location, and may determine a handoff time based at least in part on when a courier arrives at and leaves a delivery location.

At 606, the computing device may determine a first payment rate based on a distribution of courier travel times for the past orders, and a second payment rate based on a distribution of courier other time for the past orders. For example, the computing device may determine, from a plurality of past orders, a first normalized distribution for a first time component of courier time associated with the plurality of past orders, and a second normalized distribution for a second time component of courier time associated with the plurality of past orders. The first time component may correspond to travel time of individual couriers to respective pickup locations and from the respective pickup locations to respective delivery locations for each order. The second time component may correspond to other time of the courier time attributed to each order, other than the travel time. For instance, the other time may include respective wait times of the couriers at the respective merchant pickup locations, and respective handoff times of the couriers at the respective delivery locations. The computing device may determine the first payment rate based at least in part on the first normalized distribution of courier travel times for the plurality of past orders, and determine the second payment rate based at least in part on the second normalized distribution of courier other time for the plurality of past orders. Further, in some examples, the first payment rate is larger than the second payment rate.

At 608, the computing device may receive, from a buyer device, an order for an item for delivery from a merchant to an indicated delivery location. For instance, the order may specify at least one item to be prepared by the merchant and to be delivered by a courier to the buyer at the delivery location.

At 610, the computing device may determine, for a selected courier, based on the location information, a first travel time to the pickup location, and a second travel time from the pickup location to the delivery location. In some examples, the travel times may be determined, at least in part, from map information received over a network. In other examples, the travel times may be determined, at least in part, from courier location information received from the courier devices over time, which may further indicate current traffic conditions, weather, and other local conditions.

At 612, the computing device may determine a first payment amount based on the first travel time, the second travel time, and the first payment rate. The first payment amount may equal the predicted courier travel times in minutes multiplied by the first payment rate in dollars per minute.

At 614, the computing device may determine a predicted courier other time associated with the order, wherein the predicted courier other time is based at least in part on a predicted courier wait time and/or predicted courier handoff time. For instance, the predicted courier wait time may be based on at least one of a courier wait time associated with the specified merchant based at least in part on the plurality of past orders, a courier wait time associated with other merchants in a same merchant category as the first merchant, or a courier wait time associated with a service region including the delivery location and/or a plurality of service regions.

At 616, the computing device may determine a second payment amount based on the predicted courier other time and the second payment rate. For example, the second payment amount may equal the predicted courier other time in minutes multiplied by the second payment rate in dollars per minute.

At 618, the computing device may send, to the courier device, information about the order including a payment amount for the order that is based on the first payment amount plus the second payment amount. Thus, the computing device may send, to the courier, the payment amount for the order before the delivery job has been performed, and the payment amount may be based on the estimated courier effort that will be expended in performance of the delivery job.

FIG. 7 is a flow diagram illustrating an example process 700 for determining courier payments based on effort according to some implementations. In some examples, the process may be executed by the service computing device 102 or by another suitable computing device, and in part by the courier devices 138.

At 702, the computing device may determine, for a plurality of past orders, a normalized distribution corresponding to values of one or more features associated with the past orders, the one or more features associated at least in part with respective courier travel times from respective pickup locations to respective delivery locations. As mentioned above, the one or more features may include a distance from an initial location of a courier device to a pickup location associated with a merchant for a respective order; a distance from the pickup location to a delivery location for the respective order; a courier travel time from the initial location to the pickup location for the respective order; a courier travel time from the pickup location to the delivery location for the respective order; a courier wait time at the pickup location for the respective order; a courier handoff time at the delivery location for the respective order; a number of items associated with the respective order; or a category of item associated with the respective order, as well as other features enumerated elsewhere herein.

At 704, the computing device may receive, from a buyer device, a new order for an item for delivery from a merchant to an indicated delivery location. For instance, the order may specify at least one item to be prepared by the merchant and to be delivered by a courier to the buyer at the delivery location.

At 706, the computing device may determine, for the new order, a point on the normalized distribution corresponding to values of the one or more features associated with the new order. For instance, the computing device may determine current values for the one or more features of the new order, which may take into consideration at least one of: a time of day and day of a week associated with the new order; traffic conditions associated with the new order; weather conditions associated with the new order; local events associated with the new order; or a courier vehicle type associated with a courier selected as a candidate to deliver the new order.

At 708, the computing device may determine a courier payment amount for the new order based at least in part on the point on the normalized distribution. As mentioned above, in some examples, a payment rate may be associated with a median of the normalized distribution, and the payment amount for the new order may be determined based on this.

At 710, the computing device may send, to a courier device, information related to the order and an indication of the courier payment amount. For instance, the payment amount for the order may be provided to the courier in advance of the courier performing the order, and may be based on predicted courier effort expected to be expended during performance of the order.

At 712, the courier device may present, on a display, the information about the order including the payment amount for the order. For instance, information about the order may be presented in a GUI on the display.

At 714, the courier device may, in response to receiving a user input, send an indication of acceptance to the service computing device. For example, the courier may make a user input to the GUI to indicate acceptance or refusal of the delivery job.

At 716, the courier device may send an indication of a current location of the courier device to the computing device based at least in part on movement of the courier device toward the pickup location. As one example, a sensor, such as an accelerometer on the courier device may detect acceleration of the courier device, and the courier application may send an indication of the courier location to the service computing device when movement toward the merchant pickup location is detected. Further, blocks 712-716 may also be performed by the courier device following block 618 of FIG. 6.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
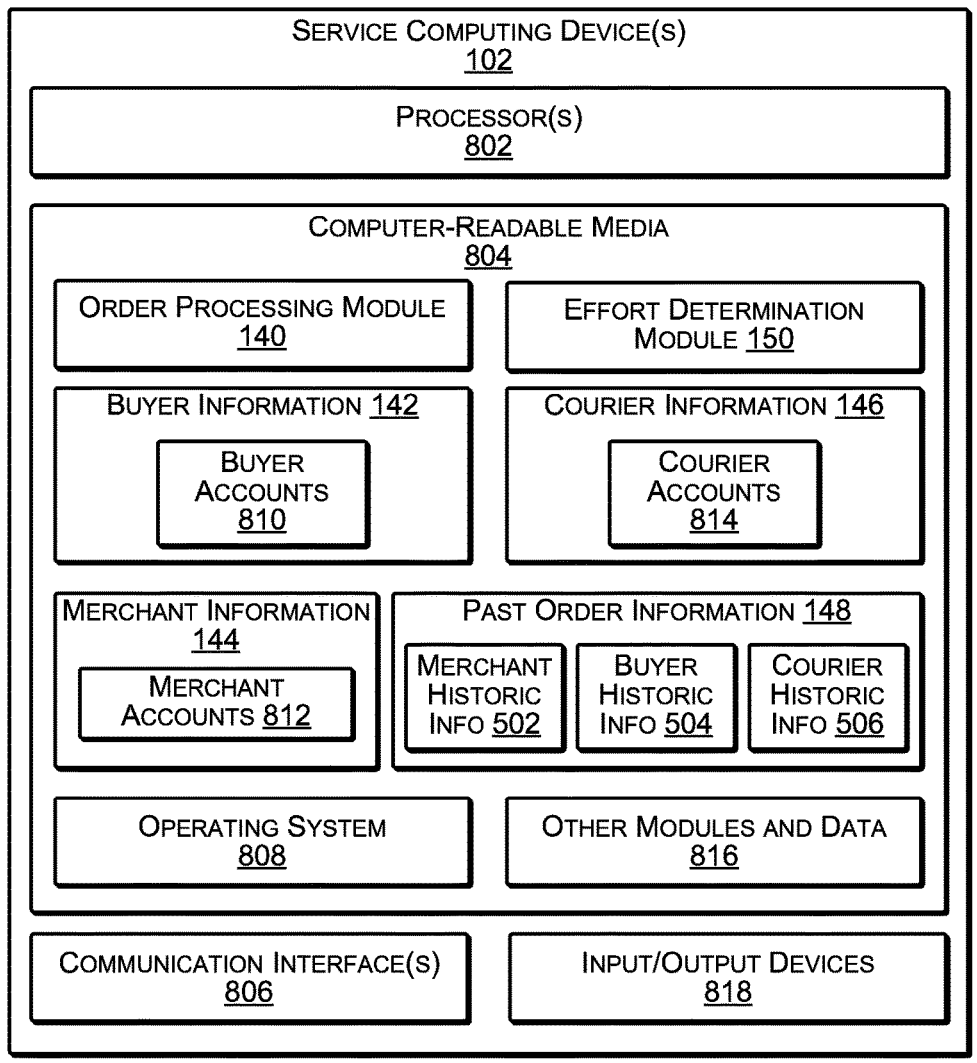
FIG. 8 illustrates select components of one or more example service computing devices according to some implementations.

FIG. 8 illustrates select components of the service computing device 102 that may be used to implement some functionality of the effort determination and order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing module 140 and the effort determination module 150. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store the buyer information 142, including buyer accounts 810, the merchant information 144, including merchant accounts 812, and the courier information 146, including courier accounts 814. Further, the computer-readable media may include the past order information 148, such as the merchant historic information 502, the buyer historic information 504, and the courier historic information 506. The service computing device 102 may also include or maintain other functional components and data not specifically shown in FIG. 8, such as other modules and data 816, which may include programs, drivers, etc., and the data used or generated by the functional components. Further, the service computing device 102 may include many other logical, programmatic and physical components, of which those described above are merely examples that are related to the discussion herein.

The communication interface(s) 806 may include one or more interfaces and hardware components for enabling communication with various other devices, such as over the network(s) 86. For example, communication interface(s) 806 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 818. Such I/O devices 818 may include a display, various user interface controls (e.g., buttons, joystick, keyboard, mouse, touch screen, etc.), audio speakers, connection ports and so forth.

Figure 9:
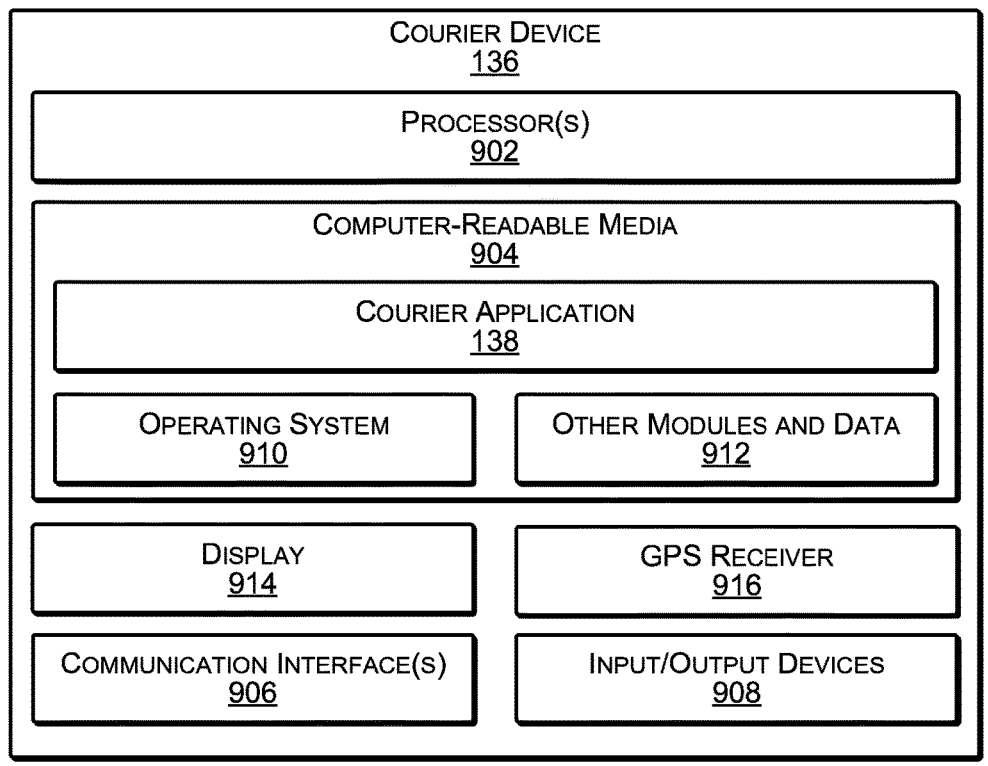
FIG. 9 illustrates select components of an example courier device according to some implementations.

FIG. 9 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches; augmented reality devices, such as helmets, goggles or glasses; and any other portable device capable of sending communications and performing the functions according to the techniques described herein.

In the example of FIG. 9, the courier device 136 includes components such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the courier device 136, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned herein, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the courier device 136. Functional components of the courier device 136 stored in the computer-readable media 904 may include the courier application 138, as discussed above, which may present the courier with one or more GUIs, some examples of which are described above, for performing the courier tasks. Additional functional components may include an operating system 910 for controlling and managing various functions of the courier device 136 and for enabling basic user interactions with the courier device 136.

In addition, the computer-readable media 904 may also store data, data structures and the like, that are used by the functional components. Depending on the type of the courier device 136, the computer-readable media 904 may also optionally include other functional components and data, such as other modules and data 912, which may include applications, programs, drivers, etc., and the data used or generated by the functional components. Further, the courier device 136 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 9 further illustrates that the courier device 136 may include a display 914, which may be any suitable type of display for visually presenting information, GUIs, or the like. The courier device 136 may further include the one or more I/O devices 908. The I/O devices 908 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 916 able to indicate location information, as well as other sensors (not shown) such as an accelerometer, gyroscope, compass, proximity sensor, and the like. In some cases, the GPS receiver 916 may be used by the courier application 138 to determine a current geographic location of the courier device 136. Additionally, or alternatively, the communication interfaces 906 may be used to determine the current location of the courier device, such as based on communication with nearby cell towers, wireless access points, and the like. In some examples, the courier application 138 may send this location information periodically to the service computing device as an indicated location of the associated courier. Additionally, or alternatively, the courier application 138 may send the location information whenever the accelerometer indicates a change in acceleration, e.g., beyond threshold amount, which may indicated starting movement or stopping movement by the courier. Furthermore, the courier device 136 may include various other components that are not shown, examples of which include removable storage, a power source, such as a battery and power control unit, and so forth. In some examples, the buyer device 132 and the merchant device 108 may include hardware structures and components similar to those described for the courier device 136, but with one or more different functional components.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system able to quantify predicted courier effort for a delivery job for determining courier payment in advance, the system comprising:
    a plurality of courier devices associated with a plurality of respective couriers, each courier device including a respective courier device processor, a respective courier device GPS receiver coupled to the respective courier device processor, and a respective courier device communication interface coupled to the respective courier device processor for communicating over the one or more networks, each courier device programmed to determine, based at least in part on information from its respective courier device GPS receiver, respective geographic locations of the courier device, and send indicated locations of the courier device over the one or more networks; and
    a service computing device including a service computing device processor, and a service computing device communication interface coupled to the service computing device processor for communicating over the one or more networks with the plurality of courier devices, the service computing device programmed to:
        receive, from the courier devices, over a period of time, respective indicated locations of the courier devices based at least in part on the respective geographic locations of the courier devices determined from the respective courier device GPS receivers;
        determine, based at least in part on the respective indicated locations of the courier devices received from the courier devices in association with a plurality of past orders, at least one of:
            wait times of the couriers at a plurality of merchant pickup locations, or
            handoff times of the couriers at a plurality of delivery locations;
        determine a first payment rate based on a distribution of courier travel times for the plurality of past orders, and a second payment rate based on a distribution of courier other time for the plurality of past orders, wherein the courier other time includes the at least one of the wait times or the handoff times;
        receive, from a buyer device, an order for delivery of an item from a first merchant to an indicated delivery location;
        determine, for a first courier associated with a first courier device of the plurality of courier devices, based at least in part on the location information, a first travel time to a pickup location associated with the merchant and a second travel time from the pickup location to the indicated delivery location;
        determine a first payment amount based on the first travel time, the second travel time, and the first payment rate;
        determine a predicted courier other time associated with the order, wherein the predicted courier other time is based at least in part on a predicted courier handoff time and at least one of:
            a courier wait time associated with the first merchant based at least in part on the plurality of past orders,
            a courier wait time associated with other merchants in a same merchant category as the first merchant, or
            a courier wait time associated with at least one of: a service region including the delivery location, or a plurality of service regions;
        determine a second payment amount based on the predicted courier other time associated with the order and the second payment rate; and
        send, to the first courier device, information about the order including a payment amount for the order, wherein the payment amount for the order is based on the first payment amount plus the second payment amount.

2. The system as recited in claim 1, wherein the service computing device is further programmed to:
    determine, from the plurality of past orders, a first normalized distribution for a first time component of courier time associated with the plurality of past orders, and a second normalized distribution for a second time component of courier time associated with the plurality of past orders, wherein:
the first time component corresponds to travel time of individual couriers to respective pickup locations and from the respective pickup locations to respective delivery locations for each order; and
the second time component corresponds to other time of the courier time attributed to each order, other than the travel time, wherein the other time includes respective wait times of the couriers at the respective merchant pickup locations, and respective handoff times of the couriers at the respective delivery locations;
determine the first payment rate based at least in part on the first normalized distribution of courier travel times for the plurality of past orders; and
determine the second payment rate based at least in part on the second normalized distribution of courier other time for the plurality of past orders, wherein the first payment rate is larger than the second payment rate.

3. The system as recited in claim 1, wherein the first courier device is further programmed to:
present, on a display, the information about the order including the payment amount for the order;
in response to receiving a user input, send an indication of acceptance to the service computing device; and
based at least in part on movement of the first courier device toward the pickup location send, to the service computing device, an indication of a current location of the first courier device based at least in part on geographic location information from the GPS receiver of the first courier device.

4. The system as recited in claim 1, wherein the service computing device is further programmed to:
determine, based at least in part on the respective indicated locations of the courier devices received from the courier devices, traffic information for a geographic region including the indicated delivery location; and
determine, based at least in part on the traffic information, the first courier travel time and the second courier travel time.

5. A method comprising:
determining, by a computing device, for a plurality of past orders, a normalized distribution corresponding to values of one or more features associated with the past orders, the one or more features associated at least in part with respective courier travel times from respective pickup locations to respective delivery locations for the plurality of past orders;
determining, by the computing device, for a new order, a point on the normalized distribution corresponding to values of the one or more features associated with the new order;
determining, by the computing device, a courier payment amount for the new order based at least in part on the point on the normalized distribution; and
sending, by the computing device, to a courier device, information related to the order and an indication of the courier payment amount.

6. The method as recited in claim 5, wherein the one or more features further comprise at least one of:
a distance from an initial location of a courier device to a pickup location associated with a merchant for a respective order;
a distance from the pickup location to a delivery location for the respective order;
a courier travel time from the initial location to the pickup location for the respective order;
a courier travel time from the pickup location to the delivery location for the respective order;
a courier wait time at the pickup location for the respective order;
a courier handoff time at the delivery location for the respective order;
a number of items associated with the respective order; or
a category of item associated with the respective order.

7. The method as recited in claim 5, further comprising determining respective values for the one or more features for the new order based on at least one of:
a time of day and day of a week associated with the new order;
traffic conditions associated with the new order;
weather conditions associated with the new order;
local events associated with the new order; or
a courier vehicle type associated with a courier selected as a candidate to deliver the new order.

8. The method as recited in claim 5, wherein the features include at least one of a courier wait time or a courier handoff time, the method further comprising:
receiving, from a plurality of courier devices associated with a plurality of couriers, respective electronic communications indicating respective indicated locations of the courier devices based at least in part on respective geographic locations of the courier devices determined through information from respective courier device GPS receivers;
determining, based at least in part on the respective indicated locations of the courier devices received from the courier devices in association with a plurality of past orders, at least one of:
wait times of the couriers at a plurality of merchant pickup locations, or
handoff times of the couriers at a plurality of delivery locations; and
determining, for the new order, at least one of a predicted wait time associated with the new order or a predicted hand off time associated with the new order based at least in part on the wait times or handoff times, respectively, determined for the plurality of past orders.

9. The method as recited in claim 5, further comprising:
receiving, from a plurality of courier devices associated with a plurality of couriers, respective electronic communications indicating respective locations of the courier devices based at least in part on respective geographic locations of the courier devices determined through information from respective courier device GPS receivers;
based at least in part on the respective locations received over time, tracking movement of the courier devices in the region;
determining an indication of the traffic conditions in the region based at least in part on tracking the movement of the courier devices; and
determining at least the courier travel time from a pickup location associated with the new order to a delivery location associated with the new order based at least in part on the traffic conditions.

10. The method as recited in claim 5, further comprising:
associating a payment amount with a median point on the normalized distribution; and
determining the courier payment amount for the new order based at least in part on a location of the point corresponding to the new order on the normalized distribution in relation to the median point on the normalized distribution.

11. The method as recited in claim 5, further comprising:
receiving, over a network, at least one of map information, traffic information, weather information, or local event information for a region including a delivery location associated with the new order; and
determining a predicted travel time from a merchant pickup location associated with the new order to the delivery location associated with the new order based at least in part on the at least one of the map information, traffic information, weather information, or local event information.

12. The method as recited in claim 11, wherein the map information provides the predicted travel time, the method further comprising:
for a plurality of past orders, comparing respective received predicted travel times received over the network with actual travel times determined from location information received from the courier devices to determine a difference between the received predicted travel times and the actual travel times; and
adjusting a predicted travel time received over the network for the new order based on the difference.

13. The method as recited in claim 5, wherein the normalized distribution is a first normalized distribution of courier travel times associated with the plurality of past orders, the method further comprising:
determining a first payment rate based on the first normalized distribution of courier travel times for the plurality of past orders, and a second payment rate based on a second normalized distribution of courier other time for the plurality of past orders, wherein the courier other time includes courier wait times at respective merchant pickup locations;
receiving, from a buyer device, the new order for delivery of an item from a merchant to an indicated delivery location;
determining, for a courier associated with the courier device, a first travel time to a pickup location associated with the new order and a second travel time from the pickup location to the indicated delivery location;
determining a first payment amount based on the first travel time, the second travel time, and the first courier payment rate;
determining a predicted courier other time associated with the order, wherein the predicted courier other time is based at least in part on the courier wait time associated with the merchant based at least in part on the plurality of past orders;
determining a second payment amount based on the predicted courier other time associated with the order and the second courier payment rate; and
sending, to the courier device, the information related to the order and the indication of the courier payment amount, wherein the courier payment amount is based on the first payment amount plus the second payment amount.

14. One or more non-transitory computer-readable media maintaining instructions that, when executed by one or more processors, program the one or more processors to:
receive, by the one or more processors, from a buyer device, an order for delivery of an item from a merchant and an indication of a delivery location;
determine, by the one or more processors, a predicted courier travel time from a merchant pickup location to the delivery location;
determine a predicted courier other time associated with the order, wherein the predicted courier other time is based at least in part on a predicted wait time associated with the merchant;
determine a first payment amount based at least in part on the predicted courier travel time and a first payment rate;
determine a second payment amount based at least in part on the predicted courier other time and a second payment rate, different from the first payment rate; and
send, to a courier device, information about the order and a courier payment amount, wherein the courier payment amount is based on the first payment amount and the second payment amount.

15. The one or more non-transitory computer-readable media as recited in claim 14, wherein the instructions further program the one or more processors to:
determine the predicted courier other time associated with the order based in part on the predicted wait time associated with the merchant, and further based in part on a predicted handoff time associated with the delivery location.

16. The one or more non-transitory computer-readable media as recited in claim 15, wherein the instructions further program the one or more processors to:
receive, from a plurality of courier devices associated with a plurality of couriers, respective electronic communications indicating respective indicated locations of the courier devices based at least in part on respective geographic locations of the courier devices determined through information from respective courier device GPS receivers;
determine, based at least in part on the respective indicated locations of the courier devices received from the courier devices in association with a plurality of past orders, respective wait times of the couriers at a plurality of merchant pickup locations, and respective handoff times of the couriers at a plurality of delivery locations; and
determine, for the order, the predicted wait time and the predicted hand off time based at least in part on the wait times and handoff times, respectively, determined for the plurality of past orders.

17. The one or more non-transitory computer-readable media as recited in claim 14, wherein the instructions further program the one or more processors to:
determine, from a plurality of past orders, a first normalized distribution for a first time component of courier time associated with the plurality of past orders, and a second normalized distribution for a second time component of courier time associated with the plurality of past orders, wherein:
the first time component corresponds to travel time of individual couriers to respective pickup locations and from the respective pickup locations to respective delivery locations for each order; and
the second time component corresponds to other time of the courier time attributed to each order, other than the travel time, wherein the other time includes respective wait times of the couriers at the respective merchant pickup locations, and respective handoff times of the couriers at the respective delivery locations;

determine the first payment rate based at least in part on the first normalized distribution of courier travel times for the plurality of past orders; and determine the second payment rate based at least in part on the second normalized distribution of courier other time for the plurality of past orders, wherein the first payment rate is larger than the second payment rate.

18. The one or more non-transitory computer-readable media as recited in claim 14, wherein the instructions further program the one or more processors to:

determine a predicted courier travel time from an initial location to the merchant pickup location, wherein the initial location is an indicated location of the courier device when the information about the order is sent; and determine the first payment amount based at least in part on the predicted courier travel time from the merchant pickup location to the delivery location and the predicted courier travel time from the initial location to the merchant pickup location.

19. The one or more non-transitory computer-readable media as recited in claim 14, wherein the instructions further program the one or more processors to:

receive, from a plurality of courier devices associated with a plurality of couriers, respective electronic communications indicating respective locations of the courier devices based at least in part on respective geographic locations of the courier devices determined through information from respective courier device GPS receivers, wherein the respective locations are received over time to enable tracking of movement of the courier devices;

receive, over a network, map information that provides the predicted courier travel time from a merchant pickup location to the delivery location for the order;

for a plurality of past orders, compare respective received predicted travel times received over the network with actual travel times determined from location information received from the courier devices to determine a difference between the received predicted travel times and the actual travel times; and adjusting the predicted travel time received over the network for the order based on the difference.

20. A system enabling effort-related determination of courier payment, the system comprising one or more processors programmed to:

receive, from a buyer device, an order for delivery of an item from a merchant and an indication of a delivery location;

determine a predicted courier travel time from a merchant pickup location to the delivery location;

determine a first payment amount based at least in part on the predicted courier travel time and a first payment rate;

determine a predicted courier other time associated with the order, wherein the predicted courier other time is based at least in part on a predicted wait time associated with the merchant;

determine a second payment amount based at least in part on the predicted courier other time and a second payment rate, different from the first payment rate; and send, to a courier device, information about the order including a courier payment amount, wherein the courier payment amount is based on the first payment amount and the second payment amount.

21. The system as recited in claim 20, wherein the one or more processors are further programed to:

determine, from a plurality of past orders, a first normalized distribution for a first time component of courier time associated with the plurality of past orders, and a second normalized distribution for a second time component of courier time associated with the plurality of past orders, wherein:

the first time component corresponds to travel time of individual couriers to respective pickup locations and from the respective pickup locations to respective delivery locations for each order; and the second time component corresponds to other time of the courier time attributed to each order, other than the travel time, wherein the other time includes respective wait times of the couriers at the respective merchant pickup locations, and respective handoff times of the couriers at the respective delivery locations;

determine the first payment rate based at least in part on the first normalized distribution of courier travel times for the plurality of past orders; and determine the second payment rate based at least in part on the second normalized distribution of courier other time for the plurality of past orders, wherein the first payment rate is larger than the second payment rate.

22. The system as recited in claim 20, wherein the one or more processors are further programmed to:

determine the predicted courier other time associated with the order based in part on the predicted wait time associated with the merchant, and further based in part on a predicted handoff time associated with the delivery location.

23. The system as recited in claim 22, wherein the one or more processors are further programmed to:

receive, from a plurality of courier devices associated with a plurality of couriers, respective electronic communications indicating respective indicated locations of the courier devices based at least in part on respective geographic locations of the courier devices determined through information from respective courier device GPS receivers;

determine, based at least in part on the respective indicated locations of the courier devices received from the courier devices in association with a plurality of past orders, respective wait times of the couriers at a plurality of merchant pickup locations, and respective handoff times of the couriers at a plurality of delivery locations; and determine, for the order, the predicted wait time and the predicted hand off time based at least in part on the wait times and handoff times, respectively, determined for the plurality of past orders.

* * * * *